(12) United States Patent
Blessin

(10) Patent No.: US 7,171,418 B2
(45) Date of Patent: Jan. 30, 2007

(54) UNIVERSAL FILE FORMAT FOR PRODUCTS THAT ALLOWS BOTH PARAMETRIC AND TEXTUAL SEARCHING

(75) Inventor: Stephen W. Blessin, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 469 days.

(21) Appl. No.: 10/101,639

(22) Filed: Mar. 20, 2002

(65) Prior Publication Data

US 2002/0184266 A1 Dec. 5, 2002

Related U.S. Application Data

(60) Provisional application No. 60/294,685, filed on May 31, 2001.

(51) Int. Cl.
- G06F 7/00 (2006.01)
- G06F 17/00 (2006.01)
- G06F 17/30 (2006.01)

(52) U.S. Cl. .................. 707/100; 707/101; 707/10

(58) Field of Classification Search .................. 707/10, 707/100, 1, 3, 101, 201; 715/513, 523, 526, 715/500; 709/218, 245

See application file for complete search history.

(56) References Cited

U.S. PATENT DOCUMENTS

| | | | | |
|---|---|---|---|---|
| 6,351,776 B1* | 2/2002 | O'Brien et al. | ............. | 709/245 |
| 6,519,617 B1* | 2/2003 | Wanderski et al. | ......... | 715/513 |
| 6,535,896 B2* | 3/2003 | Britton et al. | ............. | 715/523 |
| 6,631,379 B2* | 10/2003 | Cox | ........................... | 707/100 |
| 6,668,254 B2* | 12/2003 | Matson et al. | ................ | 707/10 |
| 6,801,531 B1* | 10/2004 | Peterson | ..................... | 370/392 |
| 6,854,120 B1* | 2/2005 | Lo et al. | ..................... | 719/311 |
| 6,990,629 B1* | 1/2006 | Heaney et al. | ............. | 715/500 |
| 2002/0004804 A1* | 1/2002 | Muenzel | ..................... | 707/513 |
| 2002/0010665 A1* | 1/2002 | Lefebvre et al. | ............. | 705/31 |
| 2003/0028577 A1* | 2/2003 | Dorland et al. | ............. | 709/100 |

OTHER PUBLICATIONS

Alexandros Labrinidis and Nick Roussopoulos (2000), Generating dynamic content at database-backed web servers: cgi-bin vs mod-perl, pp. 26-31.*

* cited by examiner

Primary Examiner—Don Wong
Assistant Examiner—Merilyn Nguyen
(74) Attorney, Agent, or Firm—Finnegan, Henderson, Farabow, Garrett & Dunner; W. Bryan McPherson

(57) ABSTRACT

Methods are disclosed for loading a database for a computerized procurement system in a standard format that will allow suppliers in varying industries that have and have not standardized their nomenclature. The first step is for a supplier to put data describing an item into the CAE format. This format easily accommodates ISO, non-ISO, and UNSPSC compliant suppliers. The format is then converted into XML which allows for easy transmittal of the information on a computerized network. Thus anyone with access to the internet can relay this information to anyone else on the internet. The information is then deconverted back into the CAE file format once it is received by someone with a procurement database. The data is then stripped from the CAE format using a parser and properly loaded into a procurement database.

15 Claims, 35 Drawing Sheets

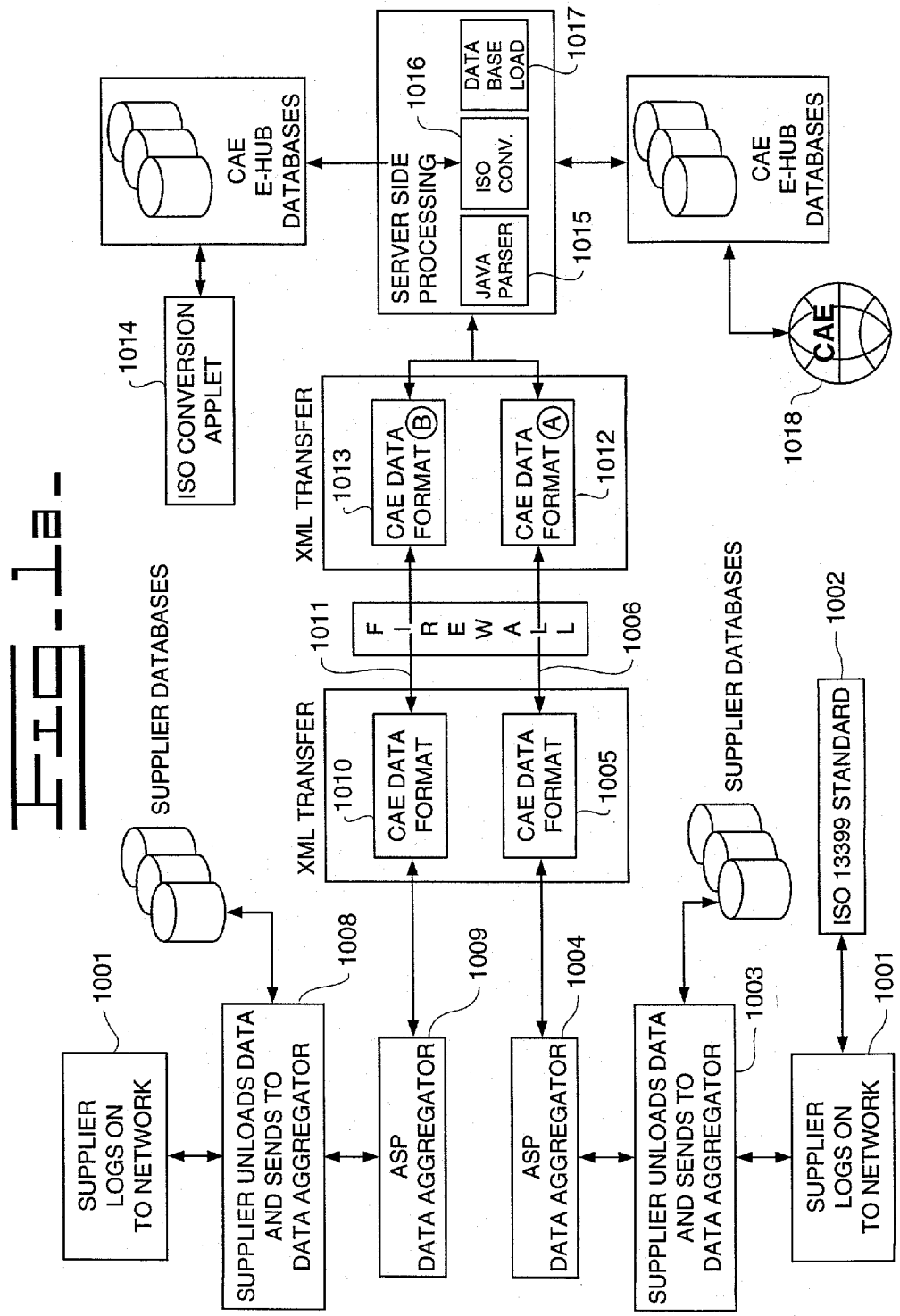

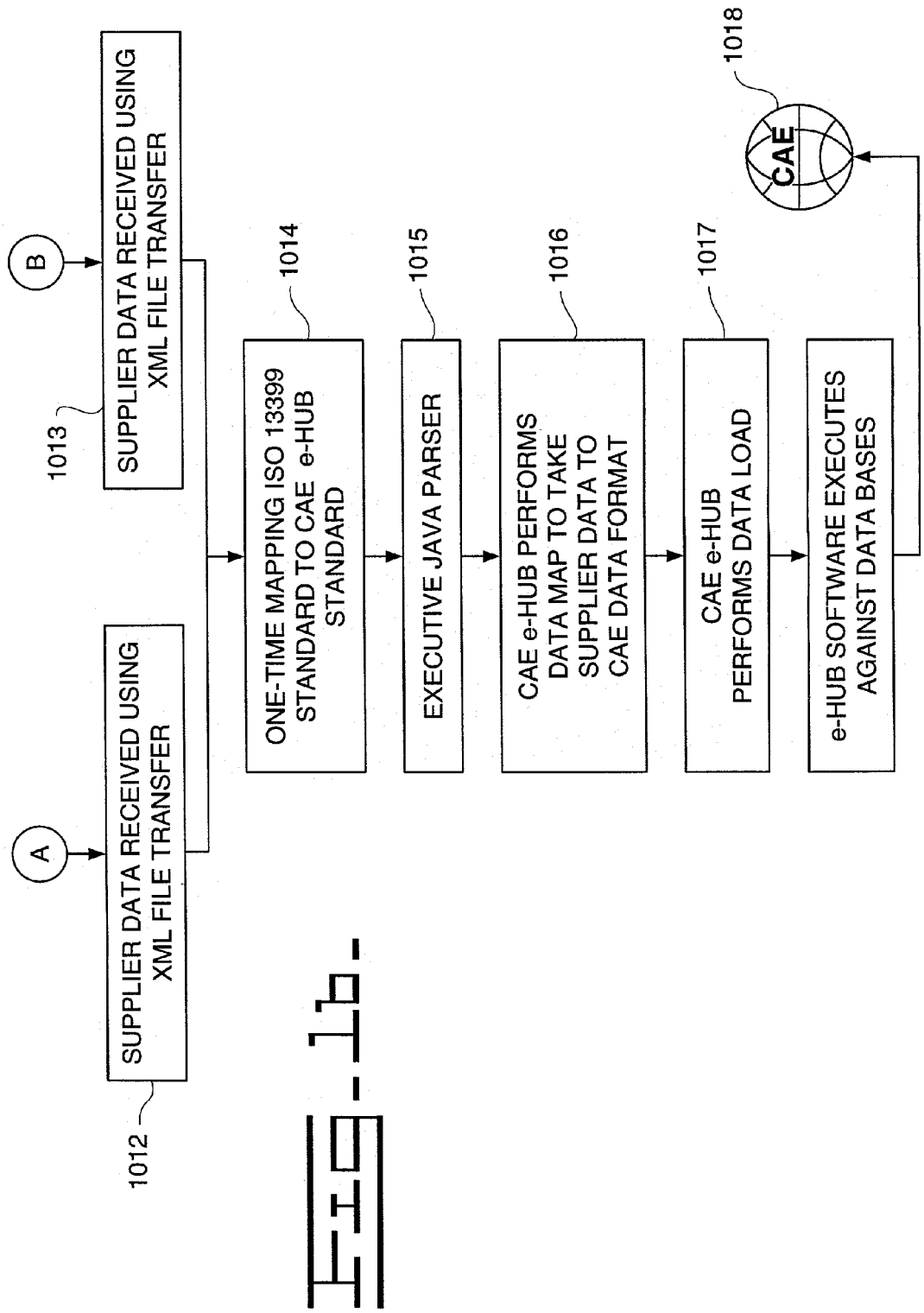

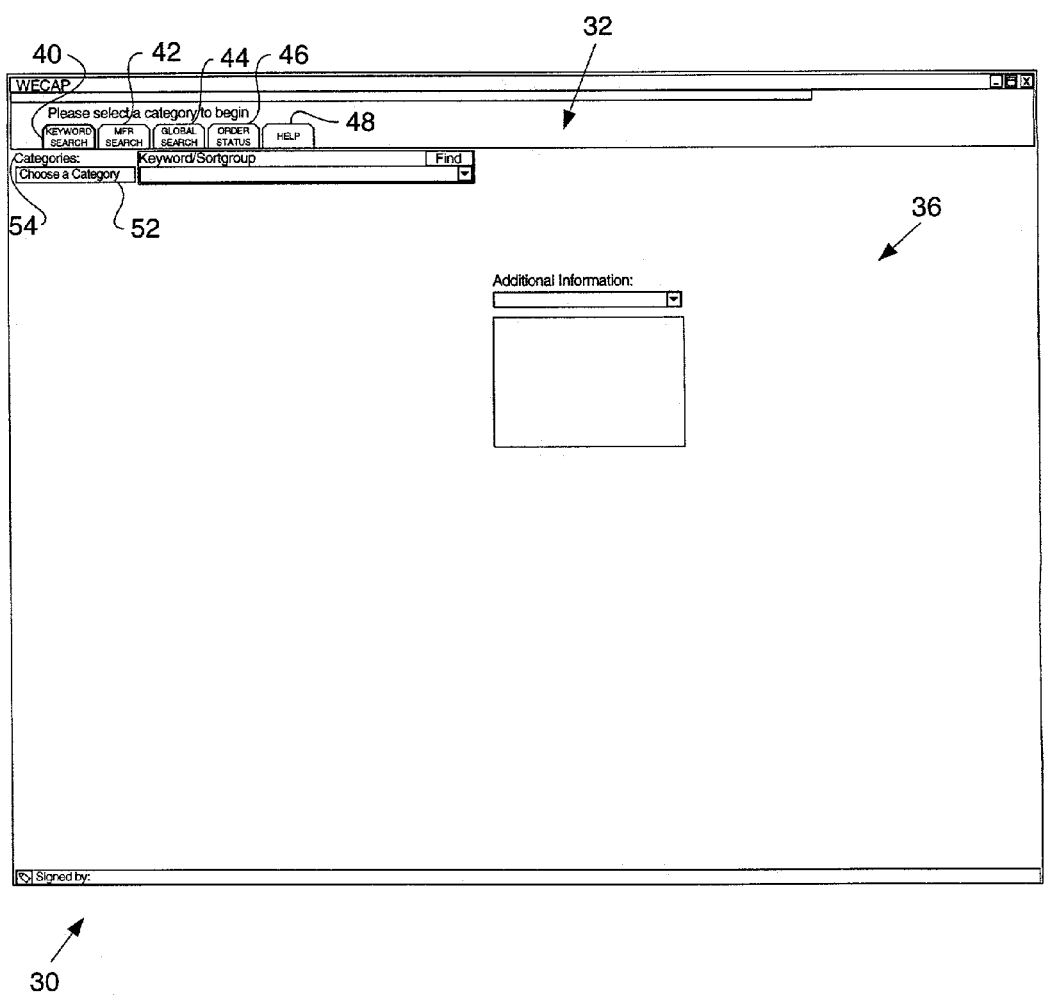

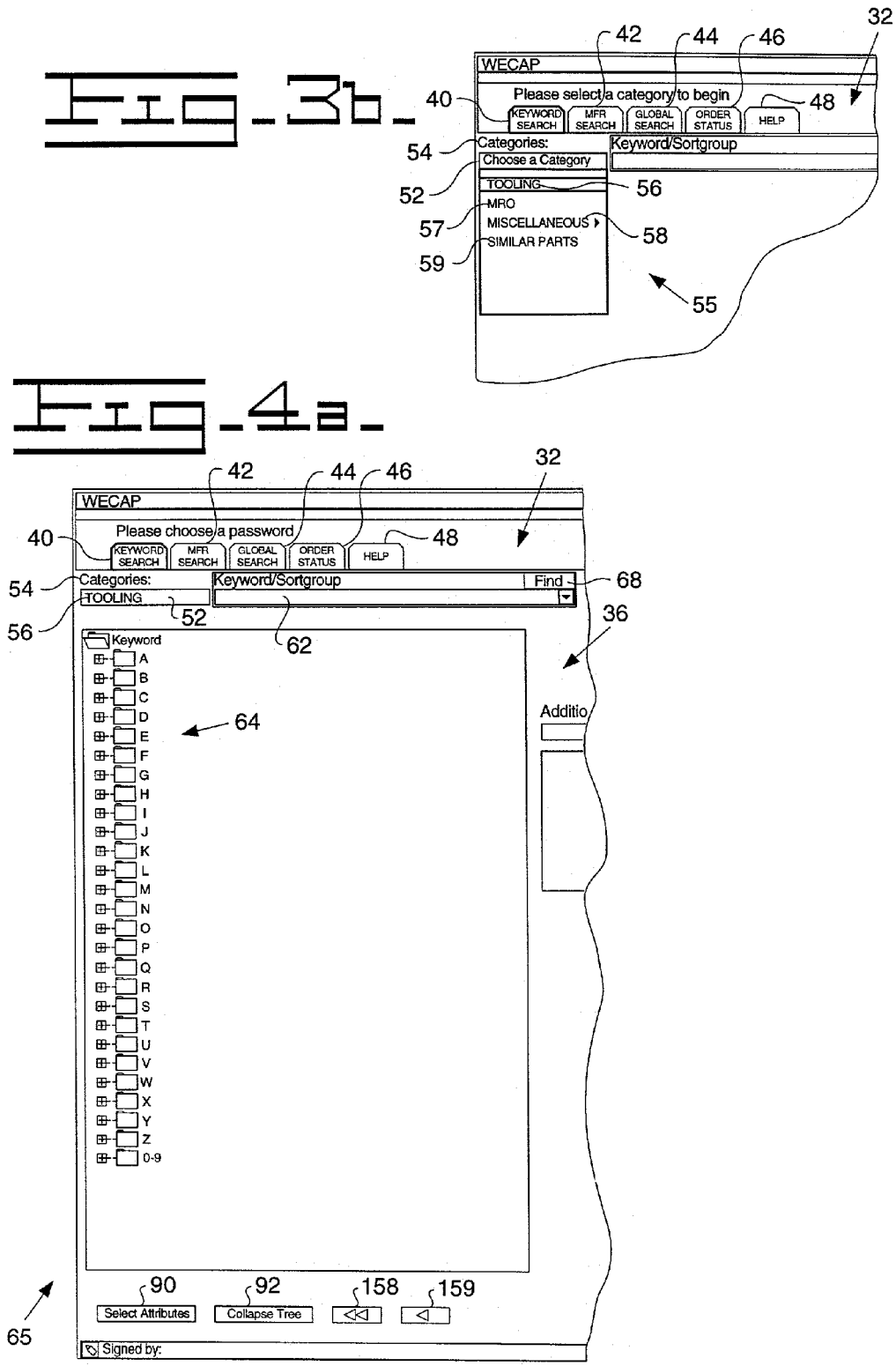

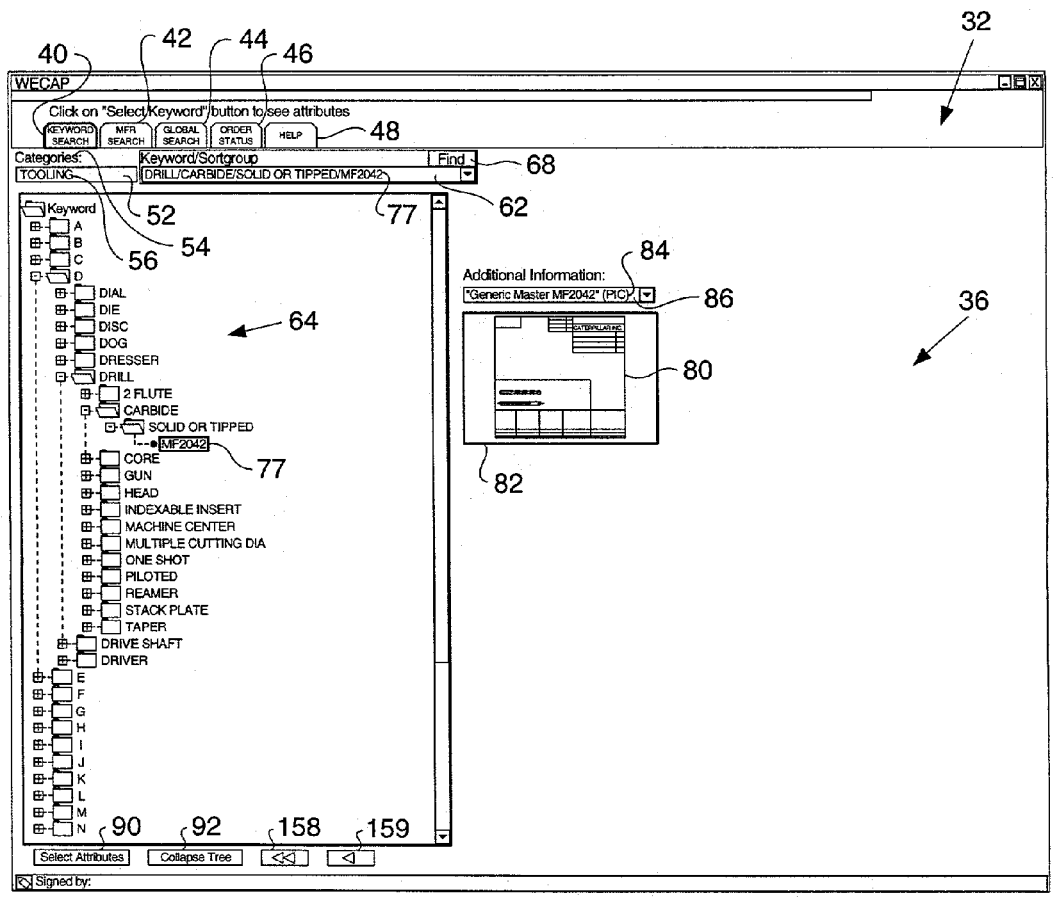
Fig_4d_

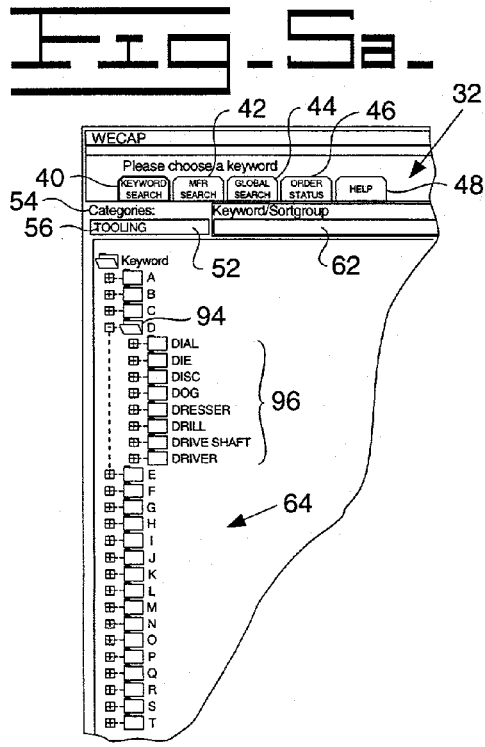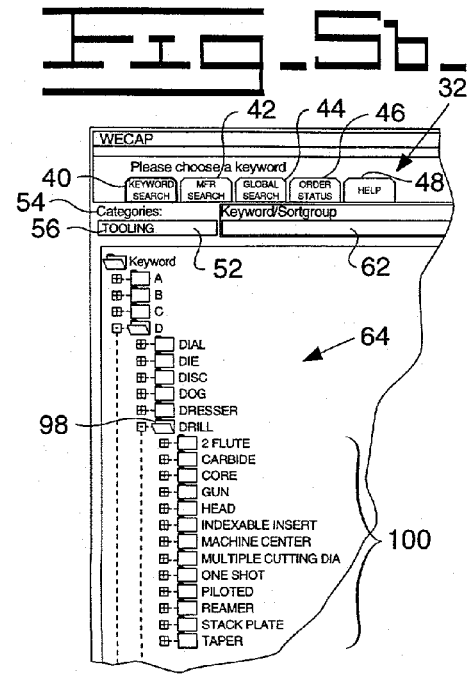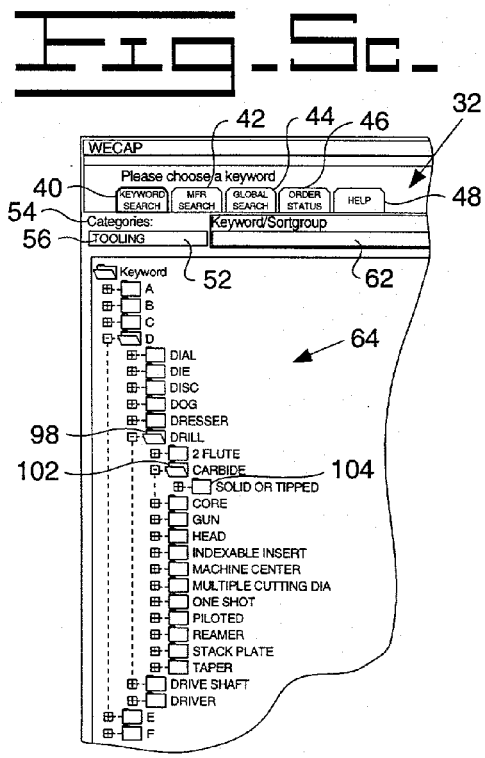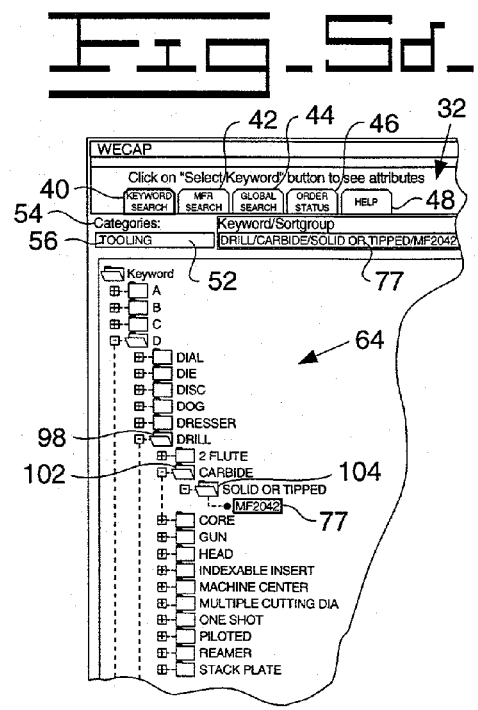

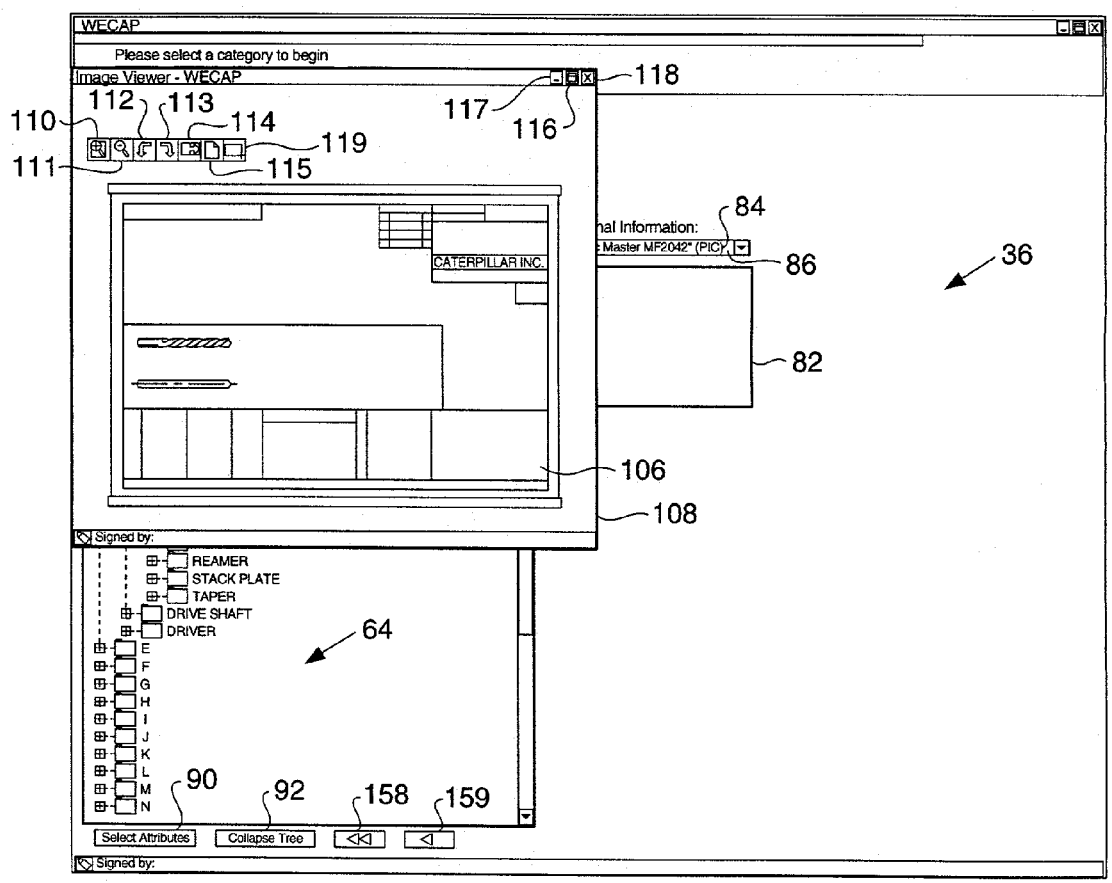

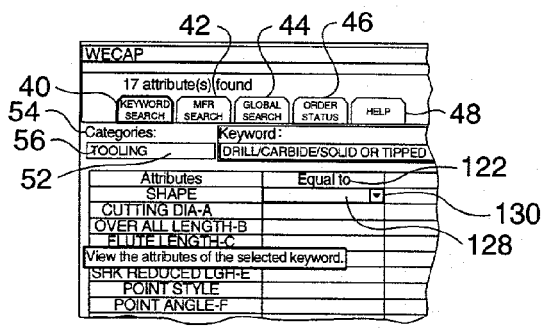
Fig_7b_
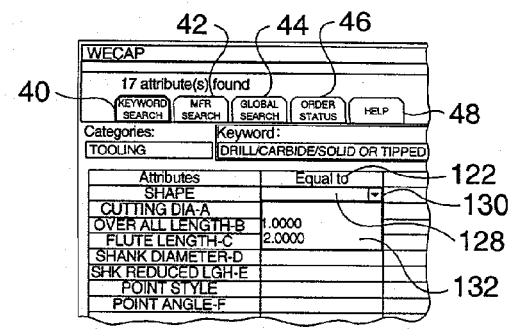
Fig_7c_
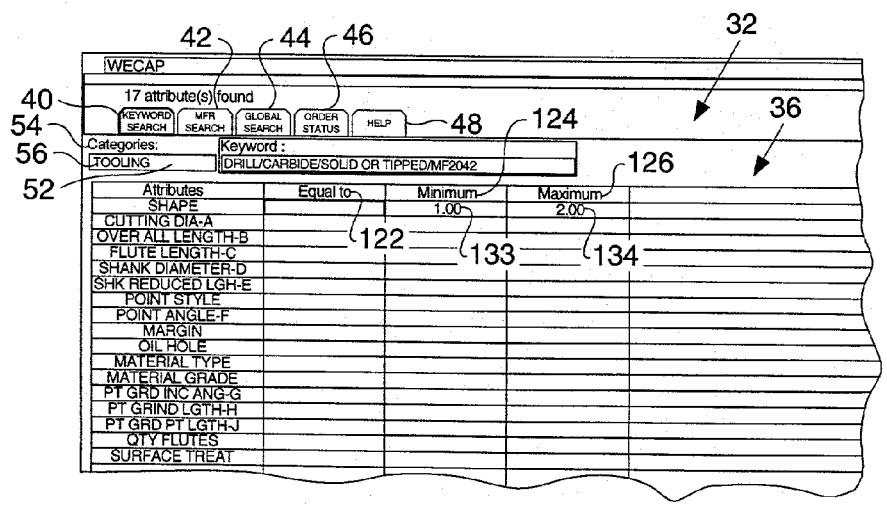
Fig_7d_

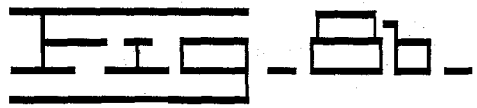

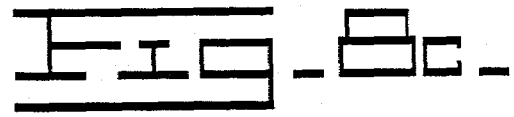
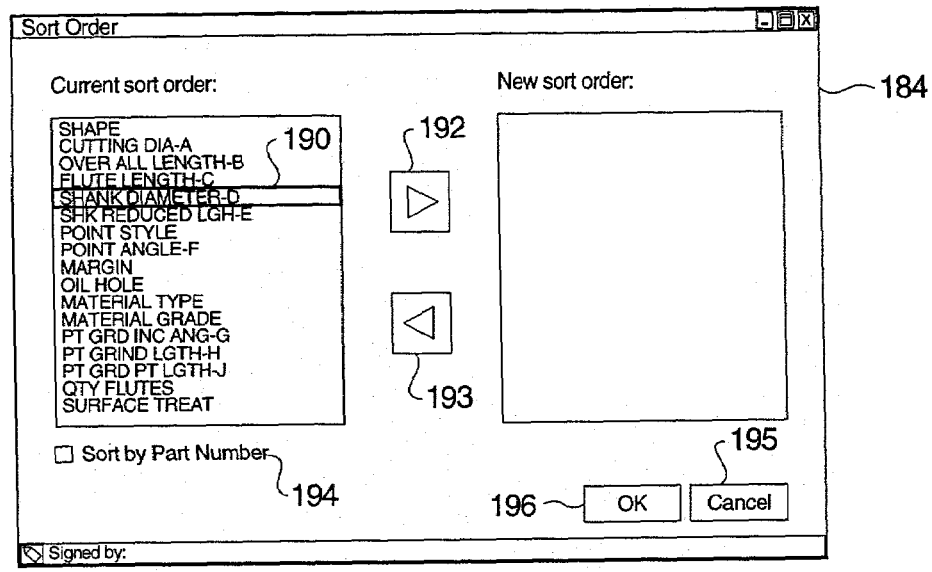
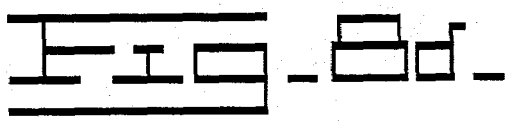
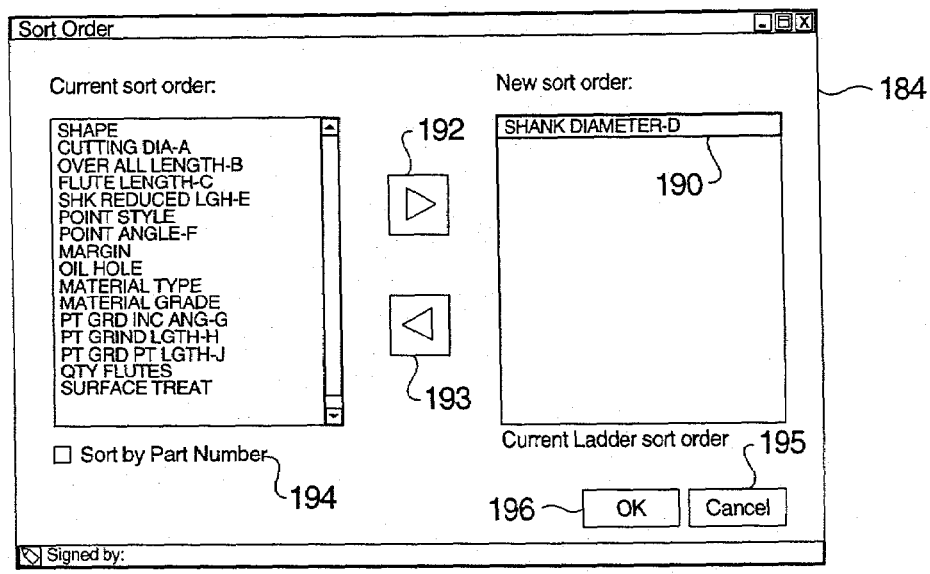

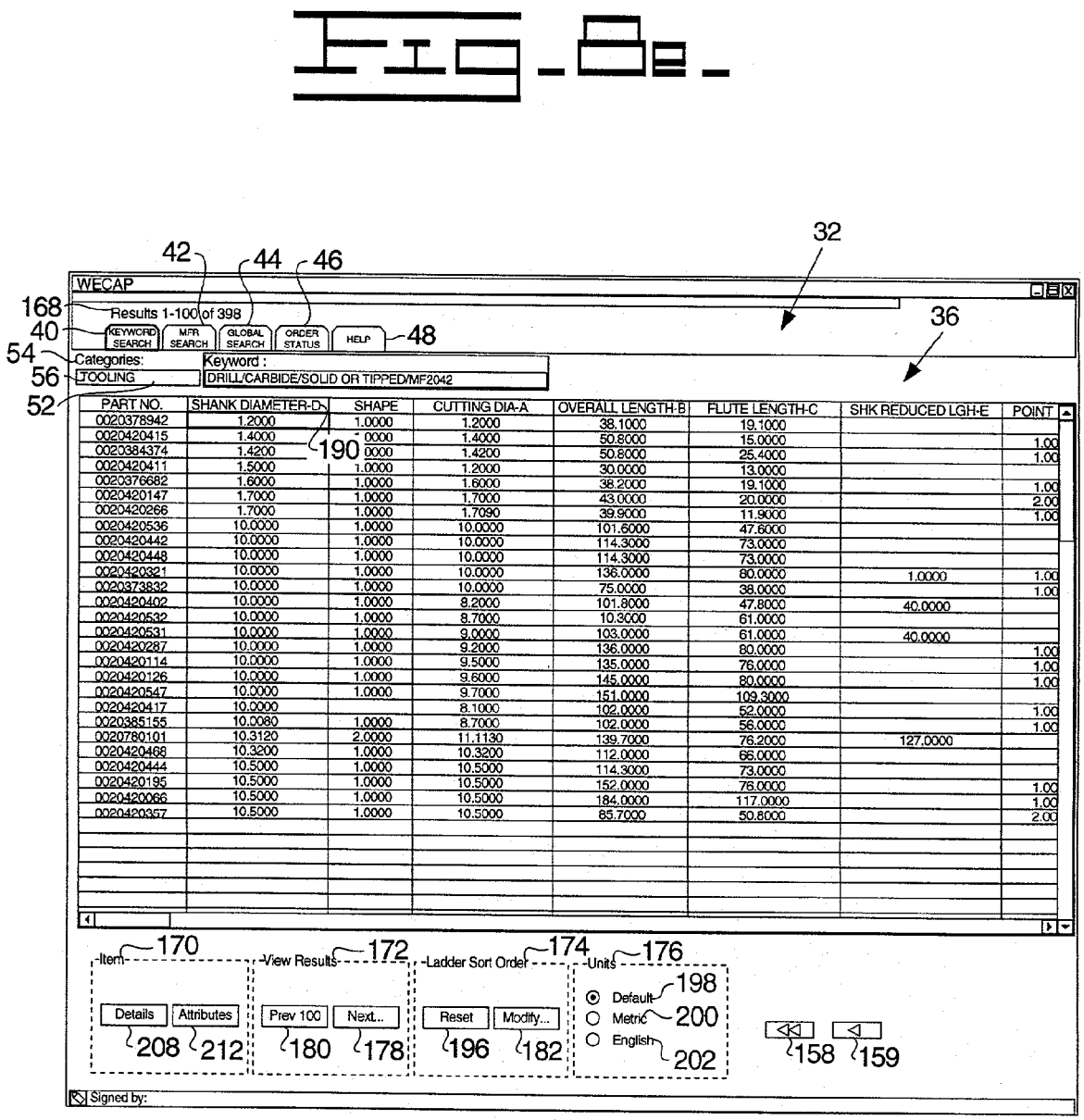

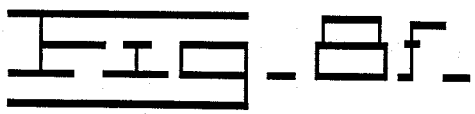
Fig_8f_

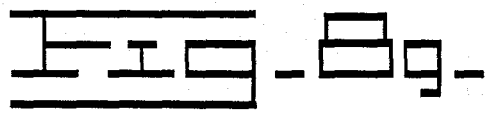
| PART NO. | CUT DIA-A | OVERALL LENGTH-B | SHANK DIA-C | SHANK LENGTH-D | TIP LENGTH-E | FLUTE LENGTH-F | PNT |
|---|---|---|---|---|---|---|---|
| 0019459262 | 20;5003 | 304;0380 | 22;2250 | 88;9000 | 57;9120 | 214;6300 | 2.00 |
| 0019456992 | 20;6375 | 393;7000 | 25;4000 | 88;9000 | 44;4500 | 292;1000 | 2.00 |
| 0019454812 | 21;0312 | 482;6000 | 38;0873 | 101;6000 | 50;8000 | 374;6500 | 2.00 |
| 0019458472 | 21;7170 | 304;8000 | 25;4000 | 76;2000 | 50;8000 | 215;9000 | 2.00 |
| 0019454002 | 22;1869 | 508;0000 | 38;0949 | 101;6000 | 76;2000 | 374;6500 | 2.00 |
| 0019457302 | 23;8125 | 406;4000 | 25;4000 | 88;9000 | 50;8000 | 292;1000 | 2.00 |
| 0019458042 | 23;8252 | 355;6000 | 38;0949 | 101;6000 | 50;8000 | 247;6500 | 2.00 |
| 0019454802 | 23;8252 | 482;6000 | 38;0949 | 101;6000 | 76;2000 | 349;2500 | 2.00 |
| 0019456282 | 24;2087 | 812;8000 | 25;3898 | 69;8500 | 38;1000 | 730;2500 | 2.00 |
| 0019457752 | 24;3865 | 508;0000 | 31;7500 | 88;9000 | 76;2000 | 381;0000 | 2.00 |
| 0019454392 | 25;4000 | 431;8000 | 38;0949 | 101;6000 | 50;8000 | 317;5000 | 2.00 |
| 0019458132 | 25;4990 | 352;5520 | 25;3949 | 141;4780 | 76;2000 | 211;0740 | 2.00 |
| 0019457922 | 26;9875 | 254;0000 | 25;4000 | 88;9000 | 61;9760 | 139;7000 | 2.00 |
| 0019457312 | 26;9875 | 406;4000 | 25;4000 | 88;9000 | 50;8000 | 292;1000 | 2.00 |
| 0019454862 | 26;9875 | 482;6000 | 38;0949 | 101;6000 | 57;1500 | 355;6000 | 2.00 |
| 0019457742 | 27;5615 | 508;0000 | 31;7500 | 88;9000 | 76;2000 | 381;0000 | 2.00 |
| 0019459287 | 32;0040 | 266;7000 | 38;0949 | 76;2000 | 51;8160 | 190;5000 | 2.00 |
| 0019459315 | 11;0000 | 558;8000 | 19;0470 | 69;9000 | 45;2000 | 482;6000 | 2.00 |
| 0019458962 | 11;5000 | 279;4000 | 25;4000 | 88;9000 | 28;4000 | 177;8000 | 2.00 |
| 0019459272 | 14;0000 | 266;7000 | 25;4000 | 88;9000 | 38;1000 | 166;0000 | 2.00 |
| 0019459252 | 14;5000 | 266;7000 | 25;4000 | 63;5000 | 63;5000 | 190;5000 | 2.00 |
| 0019458502 | 14;5000 | 304;8000 | 25;3950 | 76;2000 | 38;1000 | 215;9000 | 2.00 |
| 0019459246 | 15;0000 | 340;0000 | 25;4000 | 60;0000 | 25;4000 | 267;2000 | 2.00 |
| 0019459247 | 16;7500 | 390;0000 | 25;4000 | 60;0000 | 25;4000 | 317;2000 | 2.00 |
| 0019458812 | 17;0000 | 400;0000 | 25;4000 | 101;6000 | 17;5000 | 279;4000 | 2.00 |
| 0019459222 | 17;0000 | 400;0000 | 25;4000 | 101;6000 | 36;3000 | 285;8000 | 2.00 |
| 0019458732 | 18;2500 | 307;4000 | 22;2250 | 88;9000 | 57;9000 | 218;0000 | 2.00 |
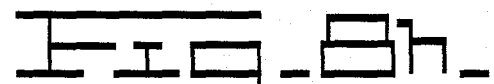
| PART NO. | CUT DIA-A | OVERALL LENGTH-B | SHANK DIA-C | SHANK LENGTH-D | TIP LENGTH-E | FLUTE LENGTH-F | PNT |
|---|---|---|---|---|---|---|---|
| 0019459262 | .8071 | 11.9700 | .8750 | 3.5000 | 2.2800 | 8.4500 | 2.00 |
| 0019456992 | .8125 | 15.5000 | 1.0000 | 3.5000 | 1.7500 | 11.5000 | 2.00 |
| 0019454812 | .8260 | 19.0000 | 1.4995 | 4.0000 | 2.0000 | 14.7500 | 2.00 |
| 0019458472 | .8550 | 12.0000 | 1.0000 | 3.0000 | 2.0000 | 8.5000 | 2.00 |
| 0019454002 | .8735 | 20.0000 | 1.4998 | 4.0000 | 3.0000 | 14.7500 | 2.00 |
| 0019457302 | .9375 | 16.0000 | 1.0000 | 3.5000 | 2.0000 | 11.5000 | 2.00 |
| 0019458042 | .9380 | 14.0000 | 1.4998 | 4.0000 | 2.0000 | 9.7500 | 2.00 |
| 0019454802 | .9380 | 19.0000 | 1.4998 | 4.0000 | 3.0000 | 13.7500 | 2.00 |
| 0019456282 | .9531 | 32.0000 | .9996 | 2.7500 | 1.5000 | 28.7500 | 2.00 |
| 0019457752 | .9601 | 20.0000 | 1.2500 | 3.5000 | 3.0000 | 15.0000 | 2.00 |
| 0019454392 | 1.0000 | 17.0000 | 1.4998 | 4.0000 | 2.0000 | 12.5000 | 2.00 |
| 0019458132 | 1.0039 | 13.8800 | .9998 | 5.5700 | 3.0000 | 8.3100 | 2.00 |
| 0019457922 | 1.0625 | 10.0000 | 1.0000 | 3.5000 | 2.4400 | 5.5000 | 2.00 |
| 0019457312 | 1.0625 | 16.0000 | 1.0000 | 3.5000 | 2.0000 | 11.5000 | 2.00 |
| 0019454862 | 1.0625 | 19.0000 | 1.4998 | 4.0000 | 2.2500 | 14.0000 | 2.00 |
| 0019457742 | 1.0851 | 20.0000 | 1.2500 | 3.5000 | 3.0000 | 15.0000 | 2.00 |
| 0019459287 | 1.2600 | 10.5000 | 1.4998 | 3.0000 | 2.0400 | 7.5000 | 2.00 |
| 0019459315 | 0.4330 | 21.9999 | 0.7498 | 2.7519 | 1.7795 | 19.0000 | 2.00 |
| 0019458962 | 0.4527 | 10.9999 | 0.9999 | 3.5000 | 1.1181 | 7.0000 | 2.00 |
| 0019459272 | 0.5511 | 10.4999 | 0.9999 | 3.5000 | 1.5000 | 6.4960 | 2.00 |
| 0019459252 | 0.5708 | 10.4999 | 0.9999 | 2.5000 | 2.5000 | 7.4999 | 2.00 |
| 0019458502 | 0.5708 | 12.0000 | 0.9998 | 3.0000 | 1.5000 | 8.5000 | 2.00 |
| 0019459246 | 0.5905 | 13.3858 | 0.9999 | 2.3622 | 0.9999 | 10.5196 | 2.00 |
| 0019459247 | 0.6504 | 15.3543 | 0.9999 | 2.3622 | 0.9999 | 12.4831 | 2.00 |
| 0019458812 | 0.6692 | 15.7480 | 0.9999 | 3.9999 | 0.6889 | 10.9999 | 2.00 |
| 0019459222 | 0.6692 | 15.7480 | 0.9999 | 3.9999 | 1.4291 | 11.2519 | 2.00 |
| 0019458732 | 0.7185 | 12.1023 | 0.8750 | 3.5000 | 2.2795 | 8.5826 | 2.00 |

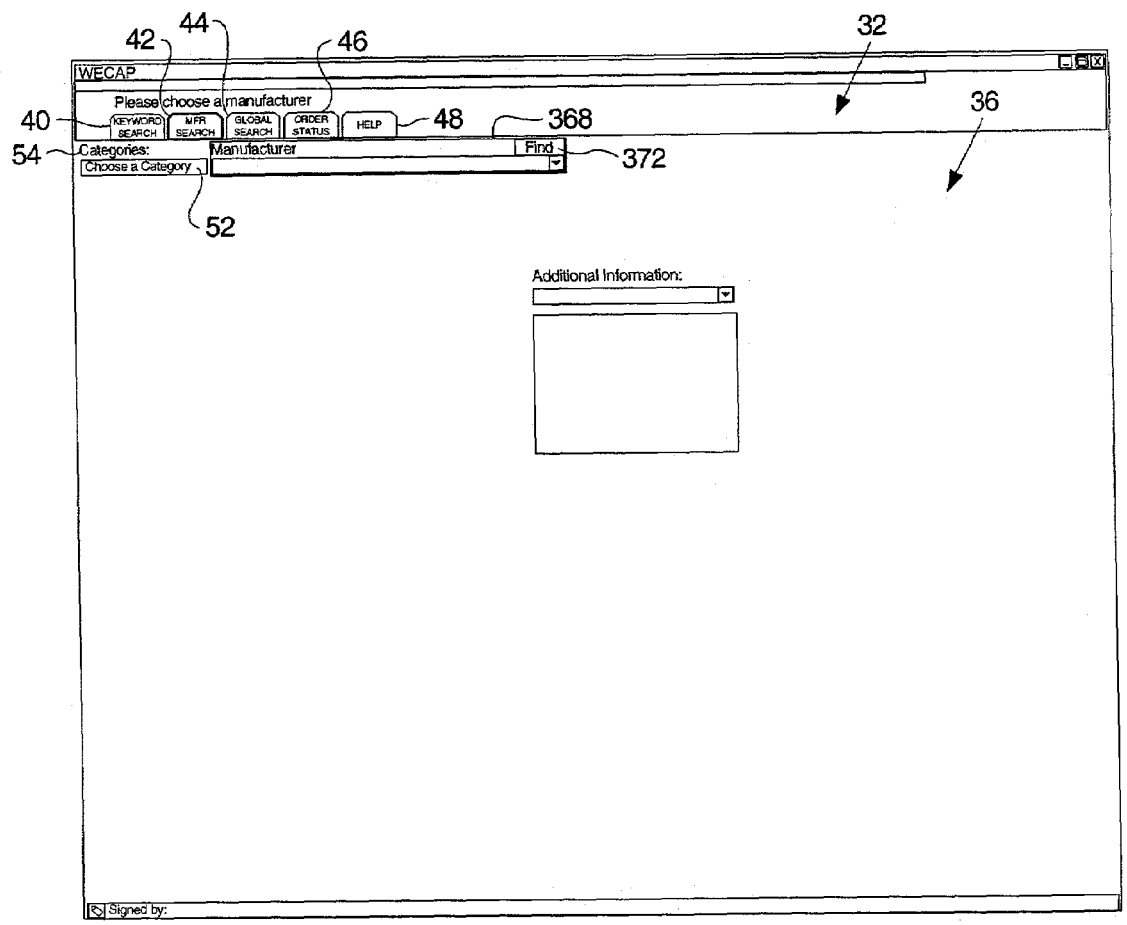
Fig_10a_

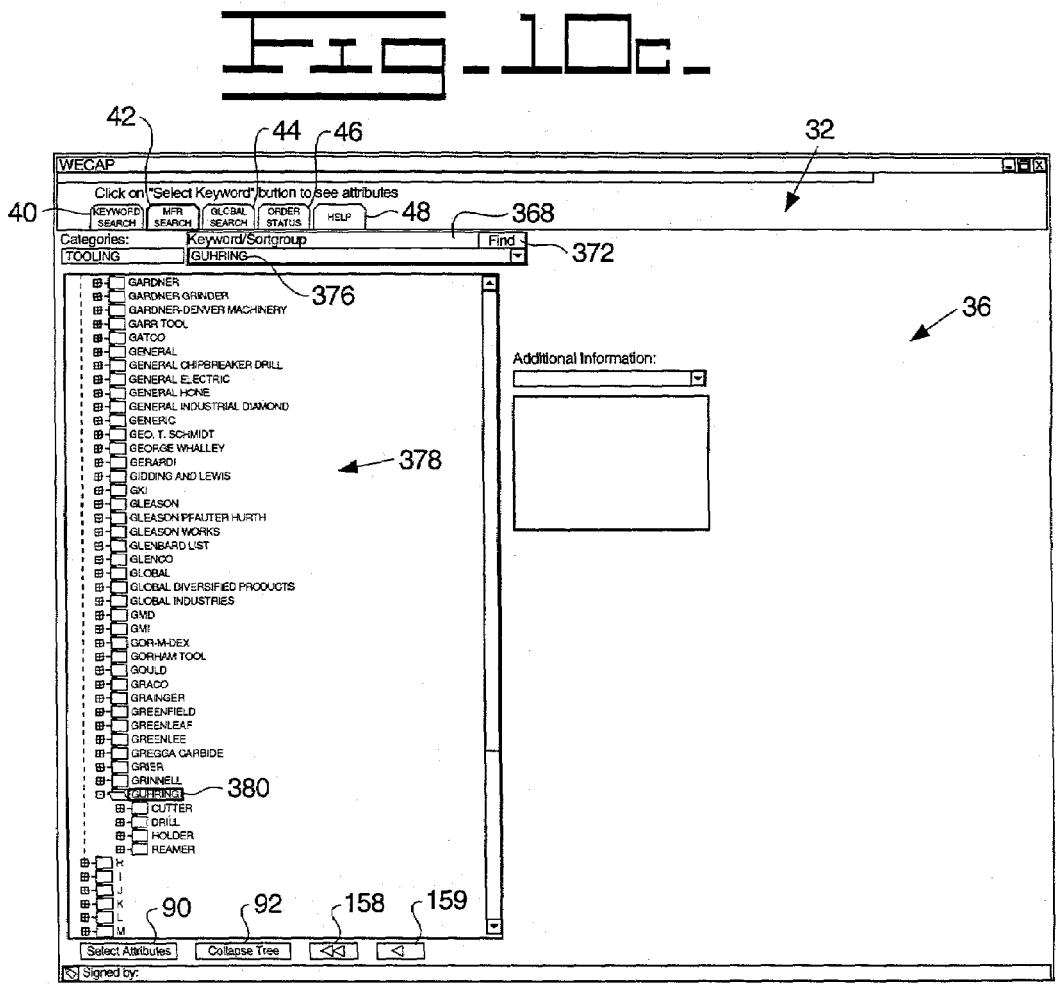
Fig. 10c.
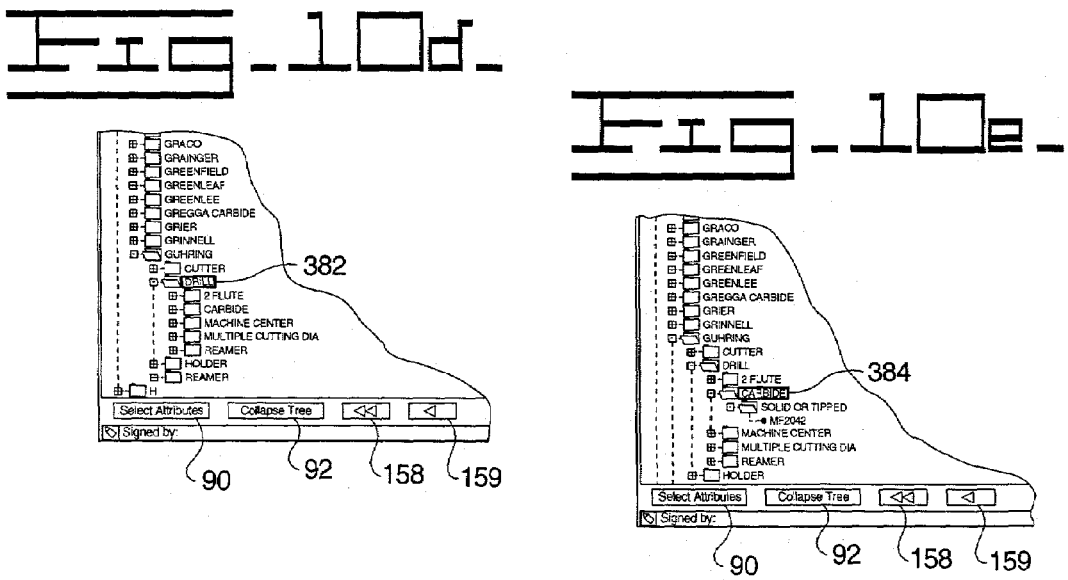
Fig. 10d.
Fig. 10e.

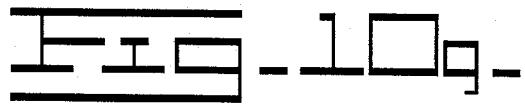
Fig-10g-
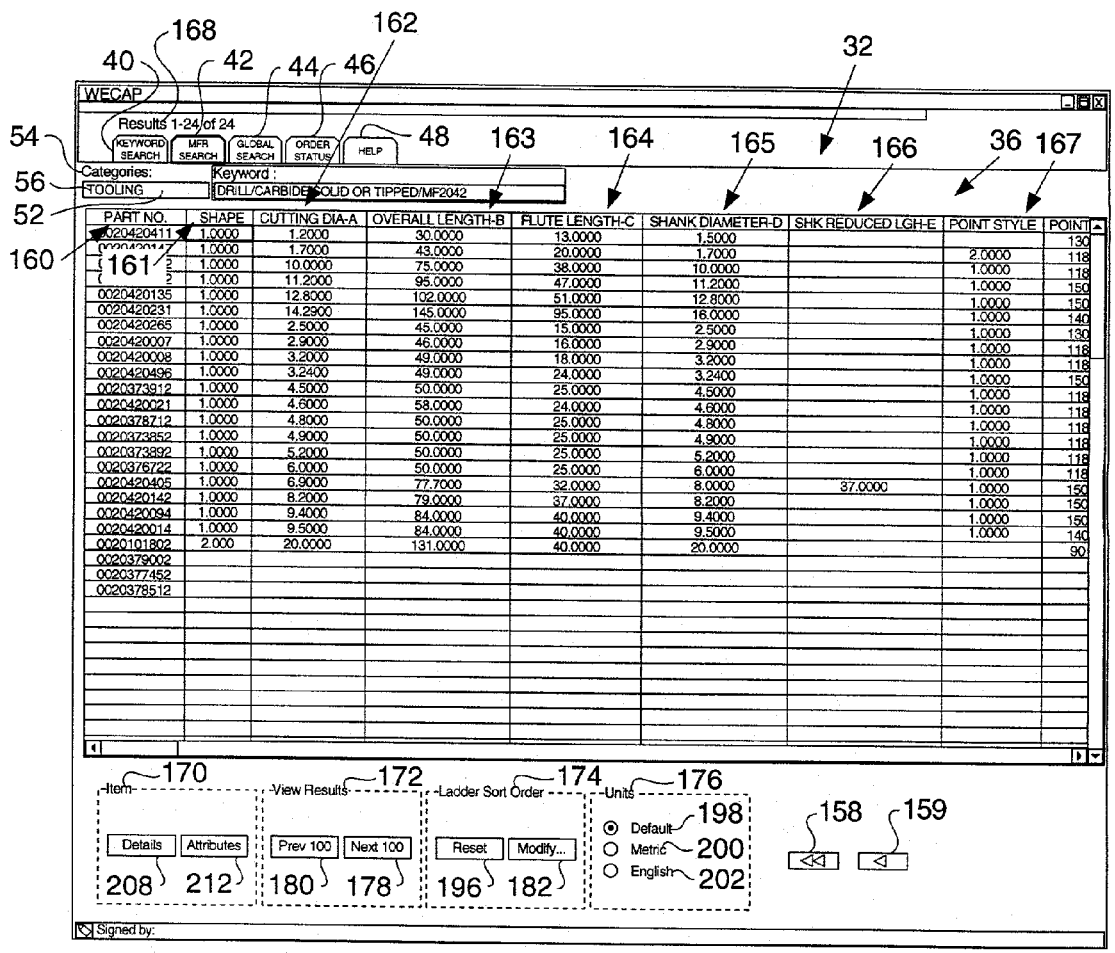

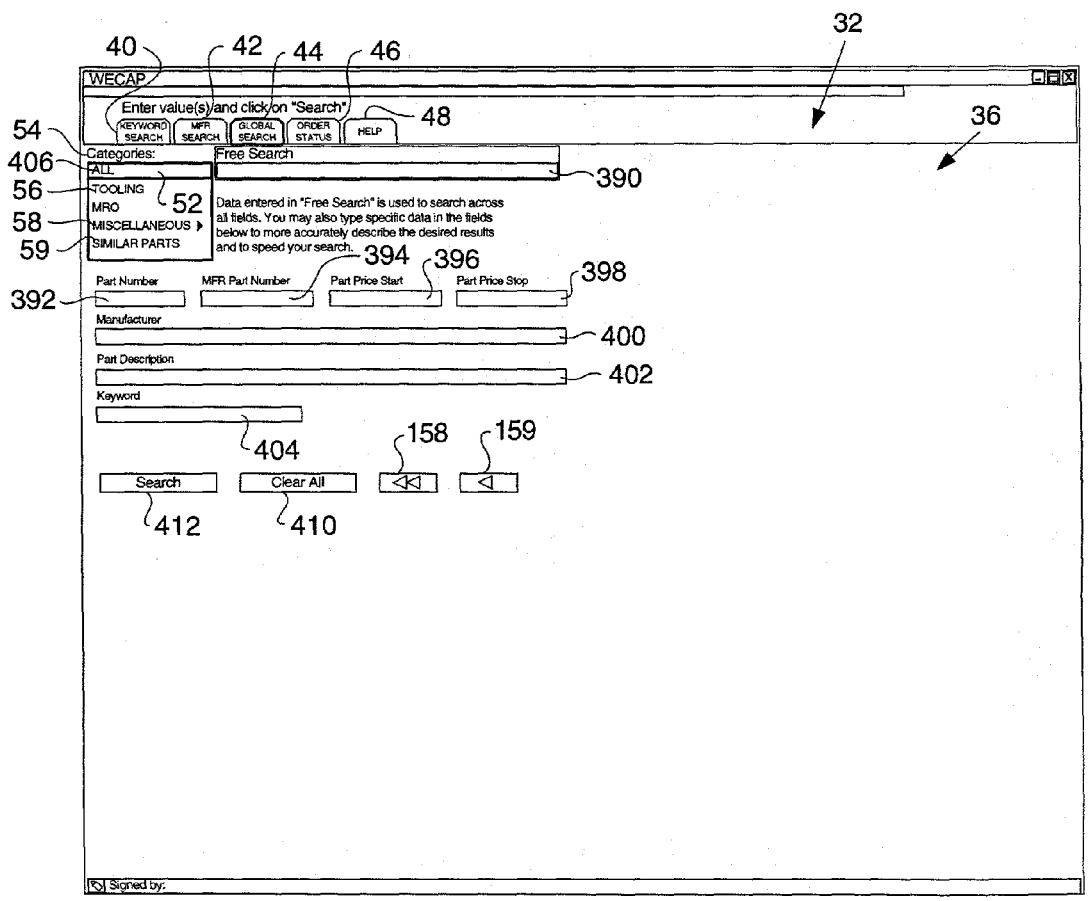
Fig_11a_

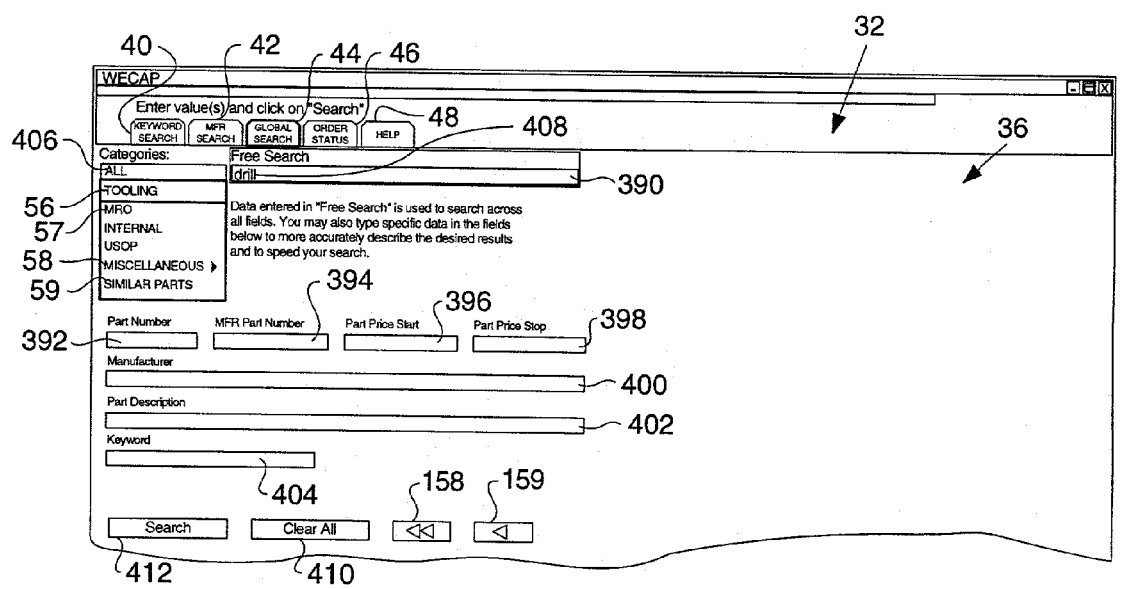
Fig_11b_

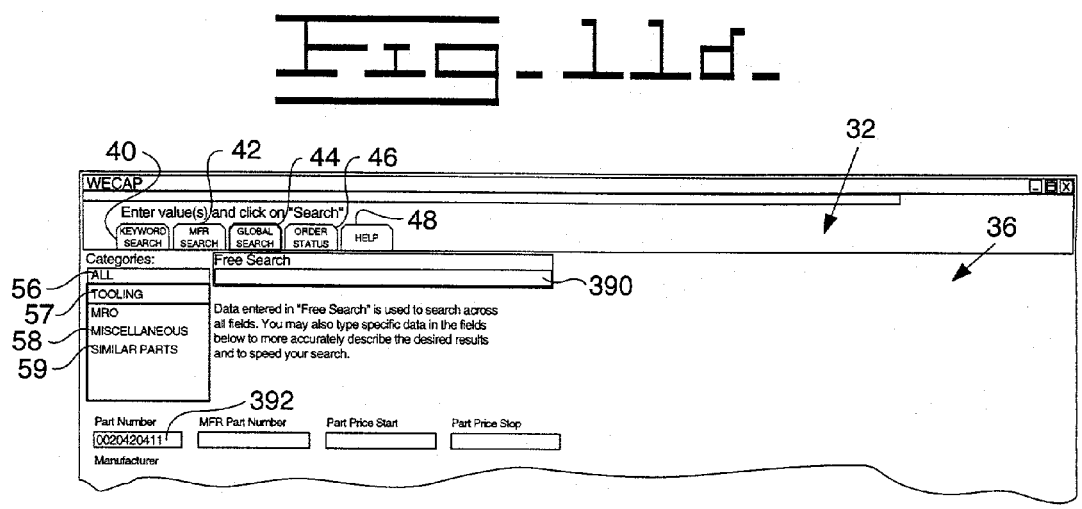
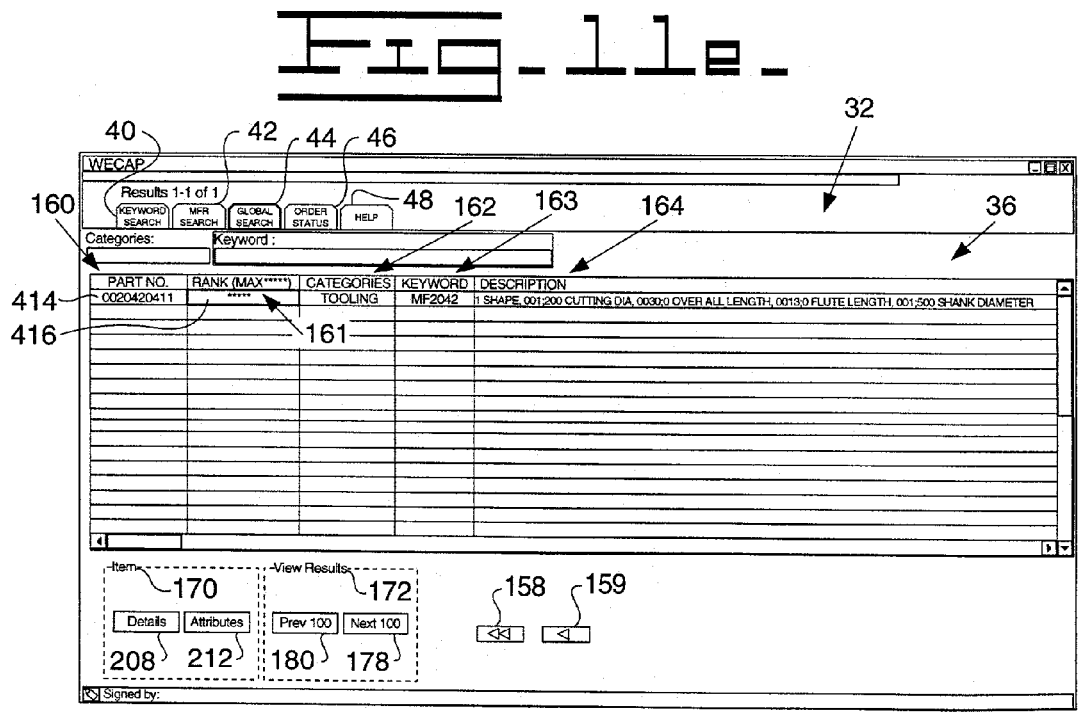

Fig. 11g.

| | | |
|---|---|---|
| Item #: | 0020420411 | |
| Category: | TOOLING | |
| Keyword: | Drill/Carbide/Solid or Tipped/MF2042 | |

| Characteristic | Value |
|---|---|
| SHAPE | 1.0000 |
| CUTTING DIA-A | 1.2000 |
| OVER ALL LENGTH-B | 30.0000 |
| FLUTE LENGTH-C | 13.0000 |
| SHANK DIAMETER-D | 1.5000 |
| SHK REDUCED LGH-E | |
| POINT STYLE | |
| POINT ANGLE-F | 130.0000 |
| MARGIN | 1.0000 |
| OIL HOLE | NO |
| MATERIAL TYPE | TC |
| MATERIAL GRADE | C-2 |
| PT GRD INC ANG-G | |
| PT GRIND LGTH-H | |
| PT GRD PT LGTH-J | .2800 |
| QTY FLUTES | 2.0000 |
| SURFACE TREAT | BRIGHT |

1 of 1

Details  Cancel

Signed by:

UNIVERSAL FILE FORMAT FOR PRODUCTS THAT ALLOWS BOTH PARAMETRIC AND TEXTUAL SEARCHING

This application claims the benefit of prior provisional patent application Ser. No. 60/294,685 filed May 31, 2001.

TECHNICAL FIELD

The present invention relates generally to searching data such as in electronic commerce ("e-commerce") and more particularly to a system and method of transferring product information in a standard file format.

BACKGROUND

The International Organization for Standardization (ISO) is a worldwide federation of national standards bodies from many countries. ISO's mission is to promote the development of standardization and related activities in the world with a view to facilitating exchange of goods and services, and to developing cooperation in the spheres of intellectual, scientific, technological and economic activity. ISO works to create international agreements which in turn are published as International Standards. ISO standards cover all technical fields except electrical and electronic engineering. Such standards are necessary for multiple reasons. First, no industry in today's world is completely independent from components, rules of application, or rules used in other industries. Secondly, emerging technologies have a greater chance of advancement when new terminology involved is standardized. Third, consumers benefit from the competition of certain fast moving technologies, i.e. computers and telecommunications equipment if there are global standards which ensure compatibility amongst different manufacturers.

Finally, industry-wide standardization results from consensus agreements reached between all economic players in that industrial sector suppliers, users, and often governments. They agree on specifications and criteria to be applied consistently in the choice and classification of materials, the manufacture of products, and the provision of services. The aim is to facilitate trade, exchange and technology transfer through: enhanced product quality and reliability at a reasonable price; improved health, safety and environmental protection, and reduction of waste; greater compatibility and interoperability of goods and services; simplification for improved usability; reduction in the number of models, and thus reduction in costs; increased distribution efficiency, and ease of maintenance.

The UN/SPSC is a global open standard for classifying products and services. The ten-digit, hierarchical classification system is the result of a merger of the United Nations' Common Coding System (UNCCS) and Dun & Bradstreet's Standard Products and Services Classification (SPSC). The UNSPSC allows companies to consistently classify the products and services they buy and sell, thereby providing a comprehensive picture of the company's business. This critical data leads to greater controls and efficiencies within the corporation.

The UNSPSC classifies products and services on five levels:

segment, family, class, commodity and business function. Its hierarchical structure consists of one, two, three, or four tier levels, depending on the specific needs of the user. Each subsequent level of detail involves a subset of codes and descriptions preceding it in the code's hierarchy. For example, ballpoint pens at the eight-digit level are a subset of writing instruments at the third tier level, which is a subset of office supplies at the second tier level. These descriptions are varying degrees of "Office Equipment, Accessories and Supplies" at the root level. An additional fifth tier level (the 9th and 10th digits), the business function, can be added to indicate a business relationship to the supplier such as rental/lease, wholesale, retail or original equipment manufacturer. Each UNSPSC is unique and allows unambiguous translation of the commodity's description in any language.

XML (Extensible Markup Language) is a set of guidelines for designing text formats for data, in a way that produces files that are easy to generate and read by computer. XML was designed to describe data and to focus on what that data is. Unlike previous markup languages, XML has the ability to draw distinctions amongst various pieces of information in its file, not just how the data should be formatted. XML uses tags (words bracketed by '<' and '>') to delimit pieces of data. For instance, <price>96.20</price> means that there is a piece of data called "price" that equals 96.20. Using this method, a user can put large amounts of structured data into a text file that can be easily transmitted and understood electronically amongst different computers.

XML is very much like a language in that it has a set of rules and a vocabulary. Each web browser will understand XML a little differently, since each company that creates a browser can determine which rules and vocabulary it will understand, and which ones to ignore. Luckily most of the grammar and vocabulary needed to make XML understood, is standardized by a governing body known as the World Wide Web Consortium (W3C). The W3C requires four separate items in order to properly render an XML page, they are:

XML is a guideline for languages that affect the organization and presentation of web pages.

XML Linking Language (XLink), which is the way that a web page should deal with a hyperlink.

XML Extended Pointer Notation (XPointer), which determines what kind of information a hyperlink may contain. A hyperlink doesn't just have to point to another web page, it can contain information about how links work within a particular document. This would allow a programmer to change all links leading to a page, by changing just one link, instead of each instance it appears on a website.

Extensible Style Language (XSL), which is the style sheet that controls how an XML page should display to a user.

XLink, XPointer and XSL are all written in XML, and all control how a web page will be displayed and link to other pages. In order to organize and understand the content of an XML page, the page needs an XML Document Type Definition (DTD).

A DTD acts as a dictionary and style guide for the XML. It defines what each term in the XML document means, and the relationships amongst them. One big advantage of using XML is not only the ability to create your own logical data structure using a DTD, but also being able to use DTD's that other have created for specific industries. Thus chemists, lawyers and artists all could have a generalized DTD that would generally fit the needs for their respective professions. This may save time for a novice (or expert) programmer who isn't too keen on reinventing the wheel for a website that clearly falls within a particular industries needs.

Currently, searching for items for procurement is a complex issue. Not only must a person know specific pieces of information about the item he wishes to find, he must also know how to properly input his request into a computer, so that the computer properly understands his request. It also happens that different procurement systems use different terminology and formatting so that a proper request on one procurement system will not be proper on another one. For example, a search done on one current e-commerce procurement system solution requires the following kind of formatting in order to return a proper search of a bolt with a ⅝" length and ¼" diameter head: bolt, len 0.625, diameter 0.25. This method, and similar types of methods are not very intuitive to a novice user, and allow for a significant number of formatting mistakes. A misspelled word or misplaced comma will cause a search to fail wasting valuable time, and causing needless frustration to a user.

As another example, if one wishes to search for a specific manufacturer's kind of bolt, the user must know the precise manufacturers' name or at least the code by which the procurement system refers to that manufacturer. If that information is inputted incorrectly, the search may very well come up empty and thus make the user think that the manufacturer doesn't make that kind of bolt. This, of course, may very well be not true because, for example, the user accidentally spelled the name of the manufacturer with a "c" instead of a "k", or inputted an improper code for that manufacturer and thus the search would not have any results for that misspelled manufacturer. The same undesired result might happen if the user did not know that the real name of the item in question did not have the name "bolt" in it (yet it was often referred to as a bolt). The system would report an empty result, yet the item is abundantly in stock.

Even if the user was correct about the name and type of item he is searching for, the list returned of possible matches could very well be unmanageable. Thus, a typical search also includes attribute characteristics about the item in question to narrow down the possible matches. A user must be familiar with terminology for the kinds of attribute characteristics of an item to help narrow down the results. For instance, one system might refer to the width of an item by "w", yet another might refer to it by "wid". Again the improper nomenclature on a system will cause the system to return an incorrect result. Not only must a user be familiar with the proper names of attribute characteristics in order to narrow his search, but he must also be aware of what the attribute characteristics are of a particular item. For instance, if one was told to find a standard hex-head bolt with a grip length of 3.18 mm, a length of 25.4 mm, and a hex size of 11.11 mm, here are some questions one might have: What is grip length? Is the grip length from the end of the bolt or the end of the threads? Is the hex size across the bolt head points or accross the bolt head flats? These questions demonstrate how much knowledge a user must have about the item he is searching for, before he looks for it. On these traditional systems, without such knowledge a user has little chance of a successful search without outside assistance.

What if a user wanted to search by more than one attribute characteristic? Currently, to do so a user might then narrow a search by specifying that the length of the item needs to be less than 10 inches and the width greater than 16 feet. To create such a request a user needs to be familiar with how the system requires the input of such relationships and multiple criteria. To specify the above criteria the proper entry might look like this: l<10" and w>16', or this: l<10"^w>192", or this: len less 10 in and wid more 16 ft. Again without knowing the specifics of a particular system, a user will have little success searching without training and practice.

It is clear from the above examples that a user needs to be familiar with many different aspects of search terminology and of the item itself before coming up with a proper search before the user even gets to look at the results. A user needs to know what attribute characteristics describe the specific product, what the abbreviations of those attribute characteristics are, how to specify a maximum, minimum or exact boundary of that attribute, what kind of measurements are relevant to such an attribute characteristic and how to specify them (feet v. inches, meters v. inches, feet v. millimeters etc.), and an understanding of how Boolean connectors (and, or, not) work to combine multiple search criteria. After all of this, a user must then still enter the search in a way that the system expects or all is for naught. Thus the user is assumed, by these traditional systems, to have a tremendous amount of innate knowledge of a particular system when performing a traditional search on a procurement system.

It is also clear from the above, that just to get results that match a specific query, a tremendous amount of effort must be made by a user to format that query properly. There always is a danger that when a result is given to a user, it might not be exactly what the user wants, not because of the data supplied, but because of the order or format it was supplied in. Thus, system searching dependence takes valuable time away from the true purpose of a procurement search system, i.e. to locate a particular item fast, efficiently, and without mistakes.

In order to successfully implement parametric searching on a database, attribute data must be organized and entered into a database. Each manufacturer needs to electronically send data regarding items to the database in a format that can be deciphered and entered into the database. Deciphering data from multiple manufacturers could be a nightmare if each manufacturer is allowed to organize his data in a different way. If this was allowed, each individual manufacturer would have to be dealt with in a unique way when trying to extract data from the electronic file he sent to a database. Since a database expects data to be organized in one particular way, there would have to be a program for each manufacturer that would decipher the data properly. It would be much simpler if there was just one standardized data format to deal with, that would satisfy all of the different manufacturers associated with a corporation needs. In the case where parametric searching is involved, figuring out what attribute characteristics define a particular item, and what the specific attributes are of each attribute characteristic are difficult. A data format must be able to handle this complexity in a way that is easy for manufacturers to enter, and for the corporation to extract.

Unfortunately, there are situations in the procurement context where an item is not able to be searched parametrically. Certain items may not yet have been standardized against an industry (or ISO and/or UN/SPSC) and thus do not have attributes that are generally understood. For instance, there are no standards for defining the attributes of a pencil. One office supplier might use color and hardness in a description, where as another office supplier might use the shape and composition of the eraser as a distinguishing feature. Since there are no standards, trying to search parametrically for such an item is nearly impossible. This does not preclude a need for pencils to be in a procurement database however.

The present invention is directed to overcoming one or more of the problems set forth above.

SUMMARY OF THE INVENTION

In one aspect of the present invention, a method of loading a database for a computerized procurement system in a standard format is disclosed. The method includes the steps of putting data describing an item in a standard file format, converting the standard file format data into XML, transmitting said XML data, deconverting said XML data back into the standard file format, parsing the standard file format to get the data describing an item, and loading the data describing an item into said database.

BRIEF DESCRIPTION OF THE DRAWINGS

The subject matter regarded as the invention is particularly pointed out and distinctly claimed in the concluding portion of the specification. The invention, however, both as to organization and method of operation, may best be understood by reference to the following detailed description, when read with the accompanying drawings, in which:

FIGS. 1A–1B illustrate a schematic flowchart representing the steps a user would following in executing the process.

FIG. 3A illustrates an example depicting the initial screen for the keyword search module 40.

FIG. 3B illustrates an individual portion of an exemplary screen depicting the category selection box 52 and pull-down menu within the keyword search module 40.

FIGS. 4A–4D illustrate individual portions of exemplary screens depicting keyword input field 62, keyword selection tree 64, and image window 82 within the keyword search module 40.

FIGS. 5A–5D illustrate individual portions of exemplary screens depicting the expanding keyword selection tree 64.

FIG. 6 illustrates an example of image window 108 overlaying a screen.

FIGS. 7A–7D illustrate whole and individual portions of exemplary screens depicting the differing attribute characteristics screens.

FIGS. 8A–8H illustrate whole and individual portions of exemplary screens displaying specific attributes of each specific item as well as the sort order window 184.

FIGS. 10A–10G illustrate whole and individual portions of images displaying exemplary screens within the manufacturer search module 42.

FIGS. 11A–11G illustrate whole and individual portions of images displaying exemplary screens within the global search module 44.

DETAILED DESCRIPTION

Figure 2:
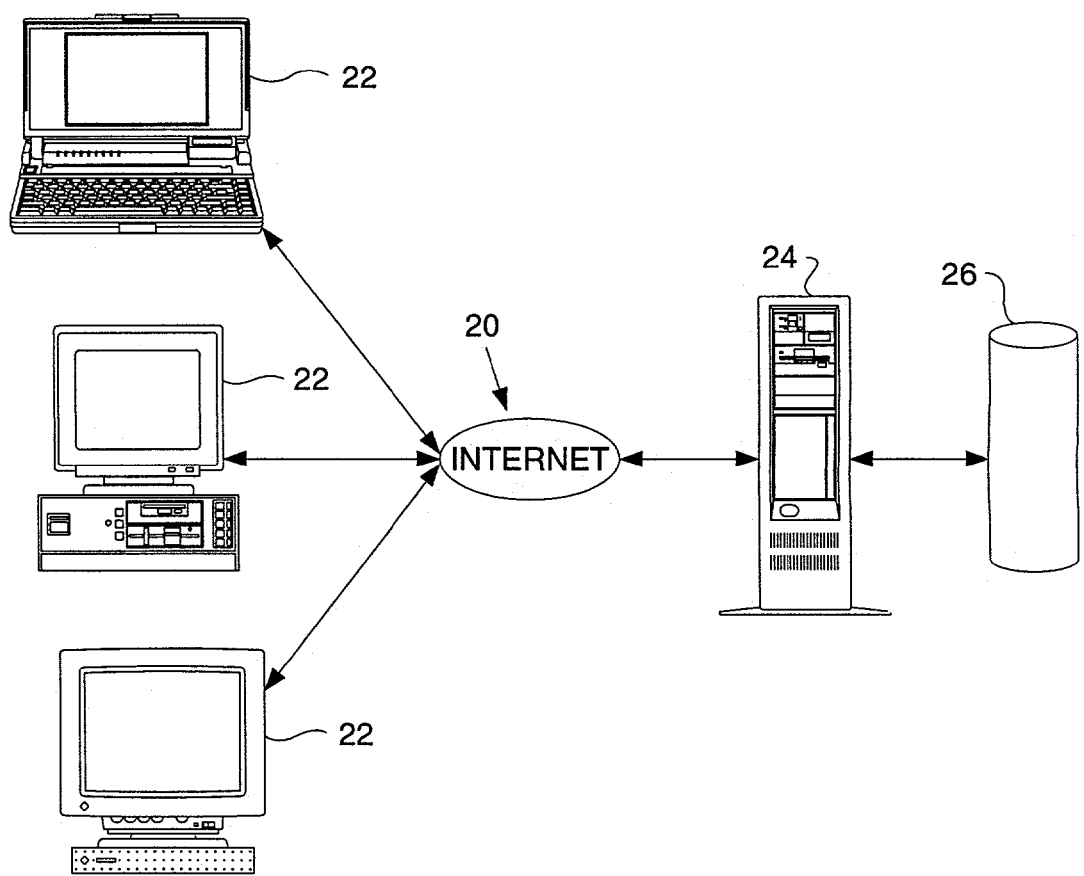
FIG. 2 is a simplistic diagram of a computer network system that is suitable for practicing one embodiment of the present invention.
Figure 4B:
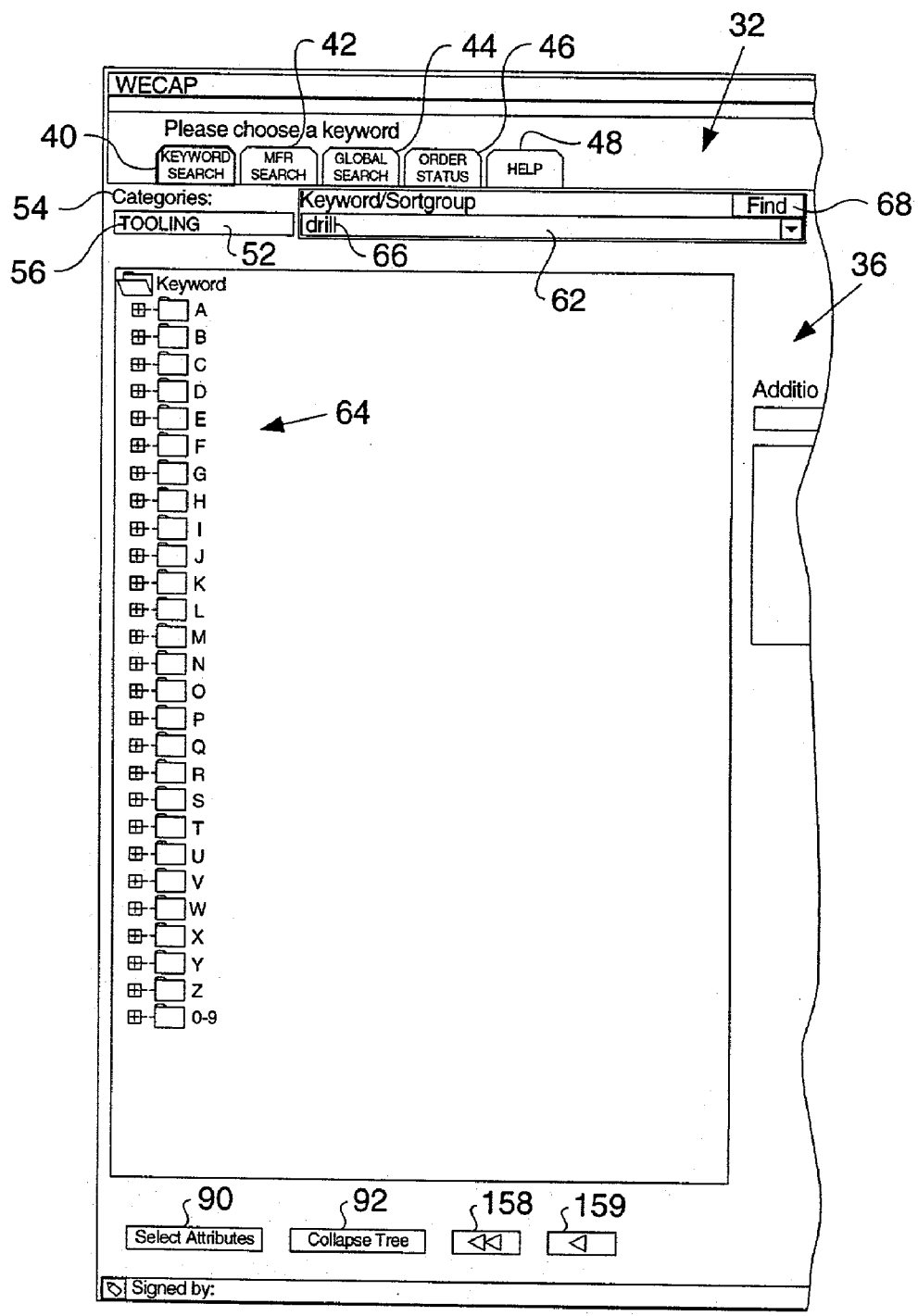
Figure 4C:
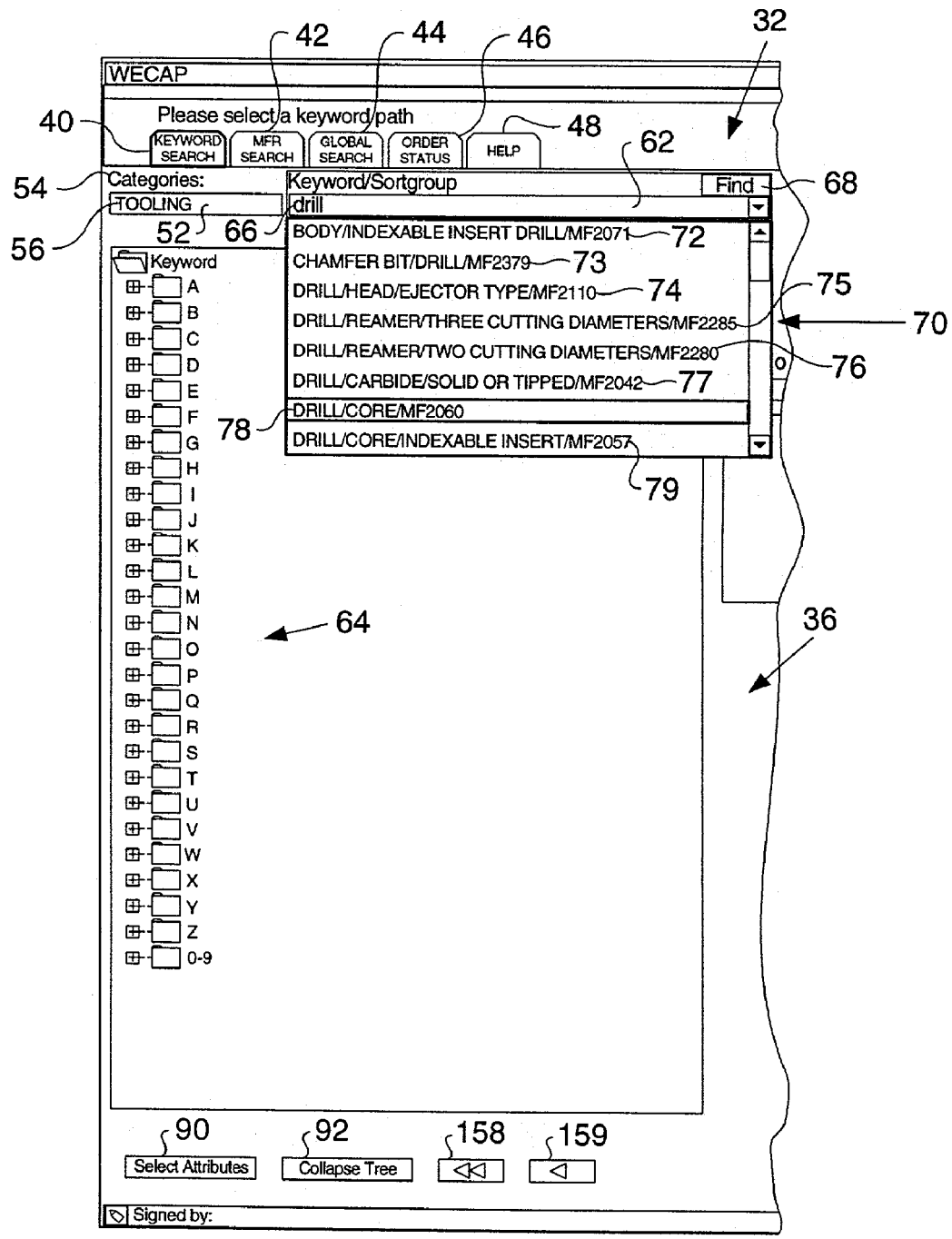
Figure 7A:
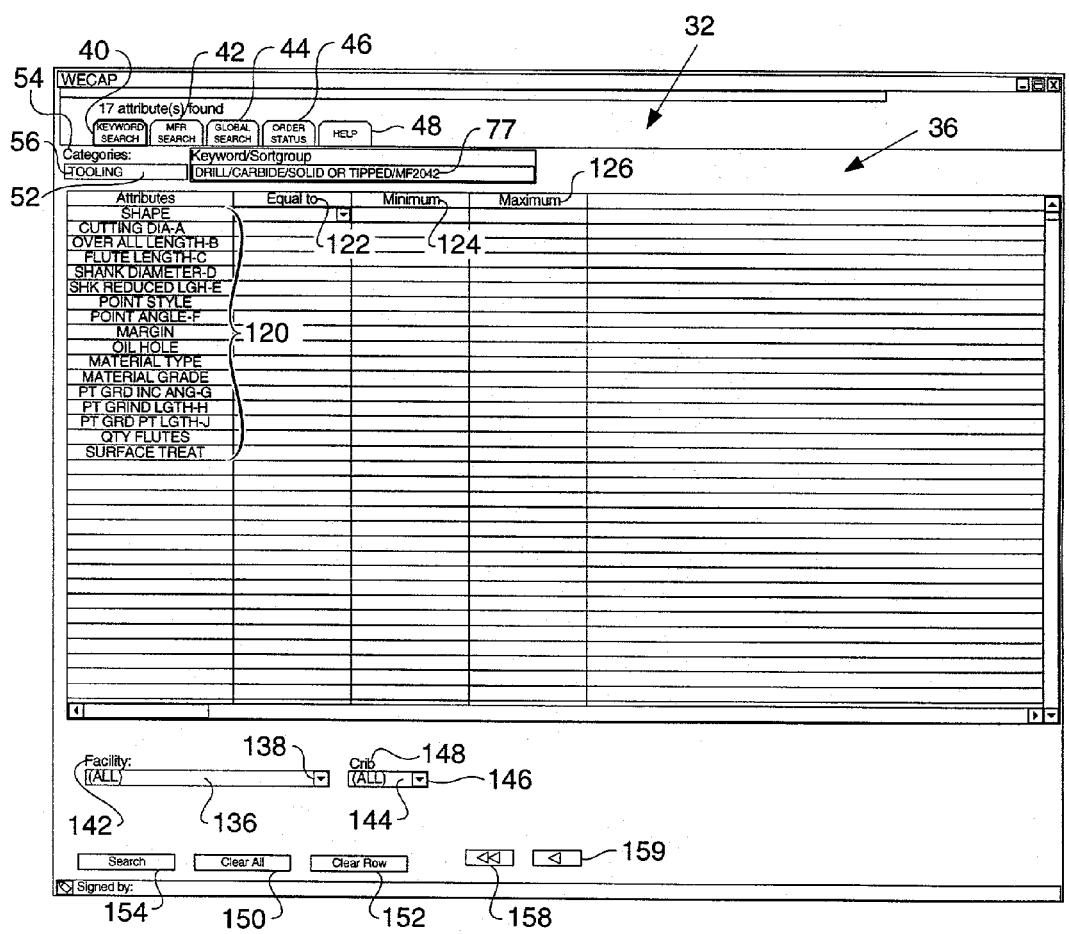
Figure 7E:
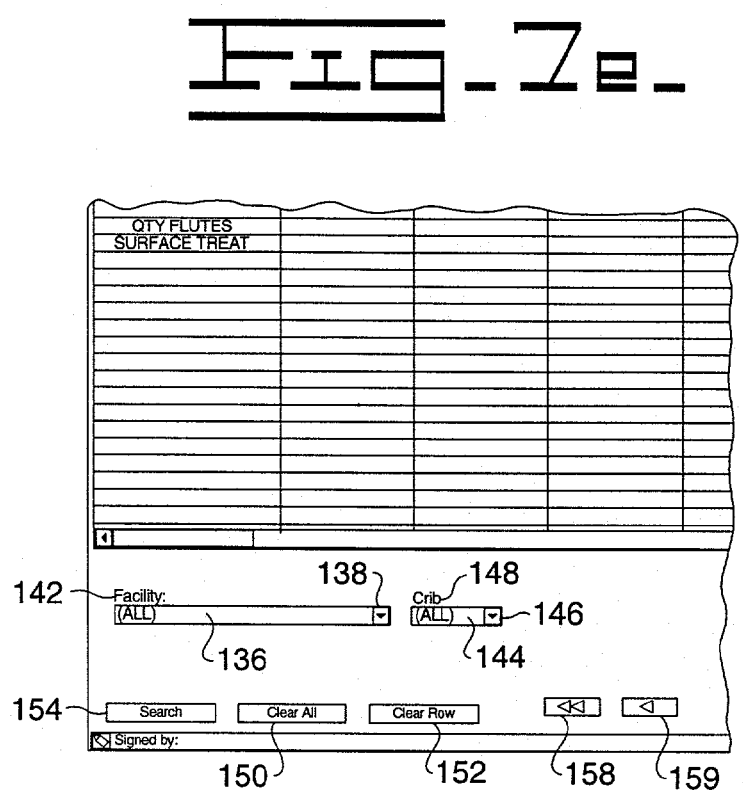
FIGS. 7E–7F illustrate whole and individual portions of exemplary screens depicting the internal location and quantity search.
Figure 7F:
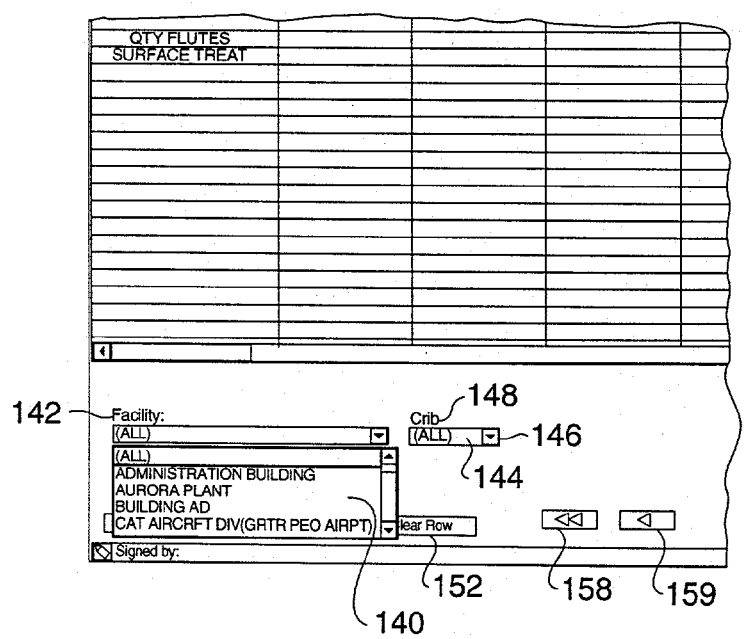
Figure 8A:
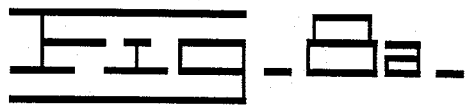

For purposes of explaining the detailed description of the invention and for purposes of making clear the intended scope of the appended claims, the following definitions of key terms are provided:

1. parametric searching: a search based upon variable quantity(ies) and/or quality(ies) that restricts or gives a particular form to the item it characterizes.

2. textual searching: a search based on the matching of a string of characters with the contents of a database.

3. attribute characteristic: a particular quality(ies) that restricts or gives a particular form to the item it characterizes.

4. specific attribute: the value of an attribute characteristic.

5. name: one or more of the elements of a keyword having a specific set of attribute characteristics, wherein keyword represents the name or string of names for initiating a parametric search for an item.

In order to use the format set forth in the present invention, a series of steps may be taken so that the organization of the data and the hardware involved is compatible. FIGS. 1A and 1B describe this process. The process is slightly different for ISO and non-ISO suppliers. The first step for an ISO supplier is to put their data into the current ISO standard 1001. In one embodiment, this process will be one that the supplier must perform. This process will utilize ISO 13399, or analogous, document. The supplier then logs on to a network or exchange that provides many services such as a data aggregator or a self-aggregation service 1002. Next, the supplier data is aggregated from ISO 13399 to Construction, Agricultural, and Engine (CAE) format 1003 (the CAE format is discussed at length below). Then the data is converted appropriately 1004. The supplier then sends the converted data to the requestor, e.g., requesting company, using the specified XML file format 1005 (Described in detail below). The data then passes through a firewall using XML file transfer format 1006. Then the data is received by the requestor in the CAE format using XML file transfer format 1012.

If the supplier is not an ISO supplier the sequence of events is different. First, the supplier then logs on to a network or exchange that provides many services 1001 and one of those could be data aggregator or a self-aggregation service 1008. The supplier data is aggregated from supplier format to CAE format 1010. The data is then converted appropriately 1009. The supplier then sends the converted data to the requestor using the specified XML file format 1010. The data then passes through the firewall using XML file transfer format 1011.

After the data has passed through a firewall from either an ISO or non-ISO supplier, the data is then received by the requestor in the CAE format using XML file transfer format 1013. Then, if the data was from an ISO supplier, the data is run through an applet that maintains internal relationship of the requestor's format to ISO 13399 format 1014. The data is also deconverted from XML to the CAE standard format in this step. Then the data is run through a Java XML parser that strips out the ISO codes and values in the CAE standard transmitted with the XML file transfer format and finally loads the corporate tables 1015. The data is now available for Internet applications on the CAE exchange 1016.

CAE File Format

The CAE file format was designed to both ISO and non-ISO compliant manufacturers to easily be able to format data about their items in a way that allows efficient transport over a network, and ready to be entered into a database designed for both parametric and non-parametric searching.

The format includes 27 separate fields, some of which may be repeated, depending upon the item. Each field describes an important aspect of a particular item and thus a manufacturer is able to describe each item in a unique way given the flexibility of the fields. The fields that are included in the CAE file format are:

The Supplier Item Number field. This is simply a number that uniquely identifies the particular item.

Next, are the Attribute Name, Attribute Value, and Attribute Value Numeric Indicator fields. The Attribute Name field holds the name of a particular attribute characteristic i.e. shape. The Attribute Value field, holds the specific attribute of that attribute characteristic i.e. rectangle. The Attribute Value Numeric Indicator field indicates whether or not the Attribute Value field is a number or not i.e. N (it is not a number). In one embodiment, these fields are then repeated in the above order for every attribute characteristic that defines the particular item.

Next are the Manufacturer Name, Manufacturer Address 1, Manufacturer Address 2, Manufacturer Address 3, Manufacturer City, Manufacturer State, Manufacturer Zip, Manufacturer Phone, Manufacturer Fax, Web Link (URL) fields. The Manufacturer Name field stores the name of the manufacturer of the part i.e. ABC Corp. The Manufacturer Address 1, Manufacturer Address 2 and Manufacturer Address 3 fields store the street address of the manufacturer i.e. Manufacturer Address 1=1234 Washington Way, Manufacturer Address 2=Dept. 1234, Manufacturer Address 3=Suite 9876. If there is no need for a second or third line in an address, either or both of the Manufacturer Address 2 or Manufacturer Address 3 fields are not used. The Manufacturer City, Manufacturer State and Manufacturer Zip fields hold the city, state and zip code for the manufacturer. For example, Manufacturer City=Abctown, Manufacturer State=AB and Manufacturer Zip=12345-6789. The Manufacturer Phone, Manufacturer Fax, Web Link (URL) fields hold the phone number, fax number and web address of the company respectively. For example, Manufacturer Phone=(123) 456-7890, Manufacturer Fax=(123) 456-7891 and Web Link (URL)=http://www.abccorp.com.

The Unit of Measure field holds the unit of measure that an item is sold in. For instance, a piece or a gallon etc.

The Bulk field holds the quantity that the item is sold in. For example, if the item is a nail and it is sold in boxes of 200, the Bulk field would contain 200.

The Price and Quantity fields store the price of an item based on the quantity purchased. These are both repeating items if necessary. For example, if an item costs $2 for 200, $3 for 325, and $4 for 500, then the first price field would contain 2, and the first Quantity field would contain 200, the second price field would contain 3, and the second Quantity field would contain 325, and the third price field would contain 4, and the third Quantity field would contain 500.

The Manufacturer Item Number field is used to store the manufacturers' part number for the item.

The Item Description field contains a detailed description of the item. This field is very important to non-ISO manufacturers, because this is the field where they can describe the particular item without needing to use attributes. The Item Description field is one of the fields that a non-parametric search will check, and thus allows this file format to accommodate non-ISO manufacturers.

The Keyword field is used to hold the name of an item. This field is used to determine what category the item is a part of. For instance, if the item is a kind of adjustable drill bit, then the keyword field will contain the entry drill/bit/adjustable. The most broad category of item is first, followed by narrower categories separated by a forward slash. This will be determined by the particular UNSPSC standard for an UNSPSC compliant manufacturer, but leads to more flexibility for a non-ISO manufacturer in categorizing their items. Thus this field is crucial to the development of the keyword search tree.

The Image File field will contain the filename of an image file of the particular item if one is provided. For instance, the Image File field might contain c:/picture/image.jpg. The Supplier Code field is used to identify the supplier of the particular item.

The Ident Number field may be used to store a number that is assigned by the requester, e.g., current organization. This field is useful for internal inventory purposes.

The Hazardous Indicator field is used to identify if the item is hazardous or not. 'Y' means the item is hazardous, 'N' means it is not.

The UNSPSC code field is used to store the ten digit UNSPSC code string which categorizes a particular item.

Finally an English-Metric Indicator field, is used to determine if the numeric values used to describe this item are in English or metric units. If this field has an 'E' the item uses English units, and if the field has an 'M' it uses metric units.

The file may then be formatted, if necessary, in a way that will be understood by a database that expects a CAE file. The data regarding an item must be in a text file. Each of the above fields is delimited (separated) by the ">" character. For instance, ACME>100 Main Street. The Manufacturer Name (ACME) is separated from the Manufacturer Address 1 (100 Main Street) by a ">". Each field should separated by a '>'. If a field does not have any data, then a '>' should still separate these fields. If in the above example there was no data for a Manufacturer Address 2 and Manufacturer Address 3 fields and the Manufacturer City was ADE, the proper format would look like this ACME>100 Main Street>>>ADE. It must also be mentioned that no field can contain the '>' character within it.

Since an item can have an indeterminate amount of attributes, the Attribute Name, Attribute Value, and Attribute Value Numeric Indicator fields are formatted in a special way. These fields will actually be a part of the Attribute Name field rather than fields by themselves. The Attribute Name will be listed first, and the Attribute Value and Attribute Value Numeric Indicator will follow, delimited by the '~' character and after the attribute value numeric indicator a semicolon (;) will be used to separate the next attribute name field. For example, >COLOR~RED~N;DIAMETER~1.4~Y;SIZE~110 VOLT~N>. This item has a red color, which is not numeric, a 1.4 diameter, which is numeric, and a 110 volt size, which is not numeric. It must also be mentioned that no attribute field can contain the '~' or ';' characters within it.

Special formatting may also be used for keywords. For example, in one embodiment, if a keyword is made up of multiple words, the words should be delimited by a "/" for example, drill/bit/adjustable. Keywords should be formatted with the most general word first, for instance, drill/bit/adjustable not adjustable/drill/bit. There also should never be a space adjacent to the "/" delimiter. Thus adjustable/drill/bit is not acceptable.

The Price and Quantity fields are allowed to repeat for items that have bracket prices. Price and quantity are separated by a "~" in these cases. For example, >2.25~10> indicates that one must purchase 10 or more of the item to receive the 2.25 price. Multiple bracket prices are separated by a ";" for example, >2.50~1;2.25~10;2.00~20>. Then one needs to buy 1 for the 2.50 price, 10 for the 2.25 price, and 20 for the 2.00 price. If the item does not have bracket prices then the single item price is used without a quantity for example, >2.50>. Thus no matter how many or few are bought, the price for each is 2.50. In one embodiment, any values in these fields must be numeric i.e. the "." character or digits 0 –9. In addition, in one embodiment, dollar signs and commas are not permissible.

Given the above rules, in one embodiment, a properly formatted CAE record layout could look like this:

GA7000505>TYPE~Weekly~N;DIMENSIONS~3.25× 6.25~N;COLOR~Black~N>ACME>100 Main Street>>>Ade>OH>43607>800-842-1234>800-760-0776>www.acme.com>EA>>8.23>BK001>Split page format lets you view two weeks at a time. Simulated leather cover.>BOOK/APPOINTMENT>b0000001.jpg>J4944B1>FC59265937>N>0102030405>E.

In addition to the above constraints, the other rules of XML should also be observed. For example, in one embodiment, the XML tags must be exactly balanced. Every start tag must have a closing tag to match it. For instance, the sequence <p><b>bold text</p></b> has mismatched tags, whereas the sequence <p><b> bold text</b></p> is correct.

In another embodiment, tag attributes must be quoted. XML requires that attribute values are quoted, either with single or double quote characters like this: <table border="1"width="95% ">.

In another embodiment, certain characters must always be "escaped" when present as data content in an XML file, according to the following: " should be represented as " ' should be represented as ' <should be represented as < >should be represented as > & should be represented as &. Failing to use these "entities" (as the XML spec calls them) may result in the creation of an invalid XML file, which no XML parser (program) may be able to read. One example of using XML entities to represent a description for an amplifier is: if the original plain-text description is: B&K amplifier, 30w per channel, <0.05% THD, rated class "A", then the XML-safe equivalent value is: B&K amplifier, 30w per channel, <0.05% THD, rated class "A".

In another embodiment, when viewed as a tree like structure, valid XML files only have one root element. In another embodiment, tag names are case sensitive, so <item_list>, <Item_List> and <ITEM_LIST> are all treated as different tags. In this case, all of the standards' tag names are entirely in lowercase.

In another embodiment, the following line must be included at the very top (outside of the root node) of every XML file: <?xml version="1.0"?>.

Each tag in the record must be accounted for. If the data for a particular tag is not available or not applicable, leave the data blank, but keep the tags intact.

Parametric Searching

Parametric searching is able to remove the guesswork from searching by proactively presenting the user with possible choices, and letting the user select which choices are desired. Parametric searching also eliminates the possibility of an incorrect search based on improper terminology or names. A database should already contain desired attribute characteristics and specific attributes about an item, and allow a user to use them to search more efficiently than traditional searches. After the type of the item is properly selected through use of a keyword, a list of all or a preselected subset of all attribute characteristics about that type of item is displayed to the user. The benefit of this is that it takes the guesswork out of the user inputting what the name of an attribute might be when searching for an item. Further, with columns titled "Equal to", "Maximum", and "Minimum" and the rows being the attribute characteristics, a spreadsheet is created where the user only has to worry about inputting the specific attributes in the appropriate cells. Also, because all or multiple attribute characteristics are shown, multiple criteria can be searched without the need of knowing connectors, simply by entering specific attributes in multiple cells that correspond to the different attribute characteristics. Thus, the only reason entered criteria would lead to no results is if the specific attributes entered in the cells did not correspond to anything in the database, not because of an improperly formatted query due to lack of system specific search terminology. Further discussion will assume that all attribute characteristics of the item are displayed for searching.

Further, now that a user has access to all of the attribute characteristics of an item, he has amazing control over the specificity of the search for an item. Whereas filling in a specific attribute for one attribute characteristic might allow for many results which satisfy the search criteria, filling in a specific attribute for multiple attribute characteristics will quickly narrow a search to just a few possible items. This allows for fast filtering of results and less time wading through results that are not desired.

Another benefit of parametric searching in this manner, is that this kind of search will always bring back a conclusive answer. When searching the traditional way, it is possible that the item being searched for exists in the database but is unable to be found because of human error in spelling or formatting etc. A user has no choices to begin with and must find something that matches his query. If there is no match, a user can never be 100% sure that it wasn't his own improper searching that caused such a result. Parametric searching changes this by giving the user everything in the database first, and letting the user filter his choices to what he wants. Thus, if a user doesn't find a match for what he is looking for, he can be assured that the item is not available in the database and, hence, not available in inventory.

A system that allows parametric searching may be built from a combination of off-the-shelf hardware and software packages and custom software. The system may exist on any conventional personal computer or workstation running a suitable operating system such as Windows™, Windows NT™, or Linux, for example. A suitable web browsing application, such as Microsoft Internet Explorer™ or Netscape™, for example may also be enabled for web-based application of the Security. One aspect of the present invention includes a technique by which a user can participate in the procurement of an item via an electronic network, such as the Internet or an Intranet, a Wide Area Network (WAN) or Local Area Network (LAN).

In one embodiment, the present invention is carried out in a computer system by a microprocessor executing files containing sequences of instructions (e.g., Java, Java Server pages, or Hypertext Markup Language or "HTML" script embedded with graphics and other scripts) contained in a memory. The execution of these instructions cause the microprocessor to perform steps of the present invention, which are described below. The instructions may be loaded into computer-readable media for execution by the microprocessor from a storage type device. Also, the instructions may be received by the computer system via a network or wireless network from another computer system. In other embodiments, hardwired circuitry may be used in place of, or in combination with, software instructions to implement the present invention.

Referring now to the drawings, and initially to FIG. 2, in one embodiment of the invention, there is a connection via Internet 20 between a client system 22 and web server system 24. Web server system 24 is a multi-user, concurrent use system and includes a web server and other programs and files that can contain references to other files in addition to a computer system in which one or more web servers and other programs run. The web server system 24 further includes a database 26, such as a relational, distributed, or object-oriented database with logic functions, processing, creating and storage, and importation and exportation of data capabilities. More specifically, the web server within the web server system 24 is a program that, using a client/server model and the World Wide Web's Hypertext Transfer Protocol or Secure Hypertext Transfer Protocol ("HTTP" or "HTTPS"), serves files containing information that form web pages to users whose client systems 22 contain HTTP clients that forward their requests. For example, a web browser application, such as Microsoft Internet Explorer®, for example, is a HTTP client that sends requests to web server systems. When a user on a client system 22 enters file requests by either "opening" a web file (typing in a Uniform Resource Locator or "URL") or selecting a hypertext link, the web browser application builds an HTTP request and sends it to the internet protocol address indicated by the URL. The web server system 24 receives such request and, after any necessary processing, the requested file is returned to the client system 22.

The client system 22 is a computer system that includes a bus, a microprocessor coupled with the bus for processing information, and a main memory, such as RAM or other dynamic storage device, coupled to the bus for storing information and instructions to be executed by the processor. The client system 22 further includes ROM or other static storage device coupled to the bus for storing static information and instructions for the processor. A storage device, such as a magnetic disk or optical disk for example, is also provided and coupled to the bus for storing information and instructions. The client system 22 also includes a communication device and various input/output devices, such as monitors, keyboards, pointing devices, or printers, both being coupled to the bus. The communication device provides the client system with a connection to the Internet 20 and may be a device suitable for such purpose, such as a telephone or cable modem, ISDN adapter, or wireless adapter for example.

Figure 9:
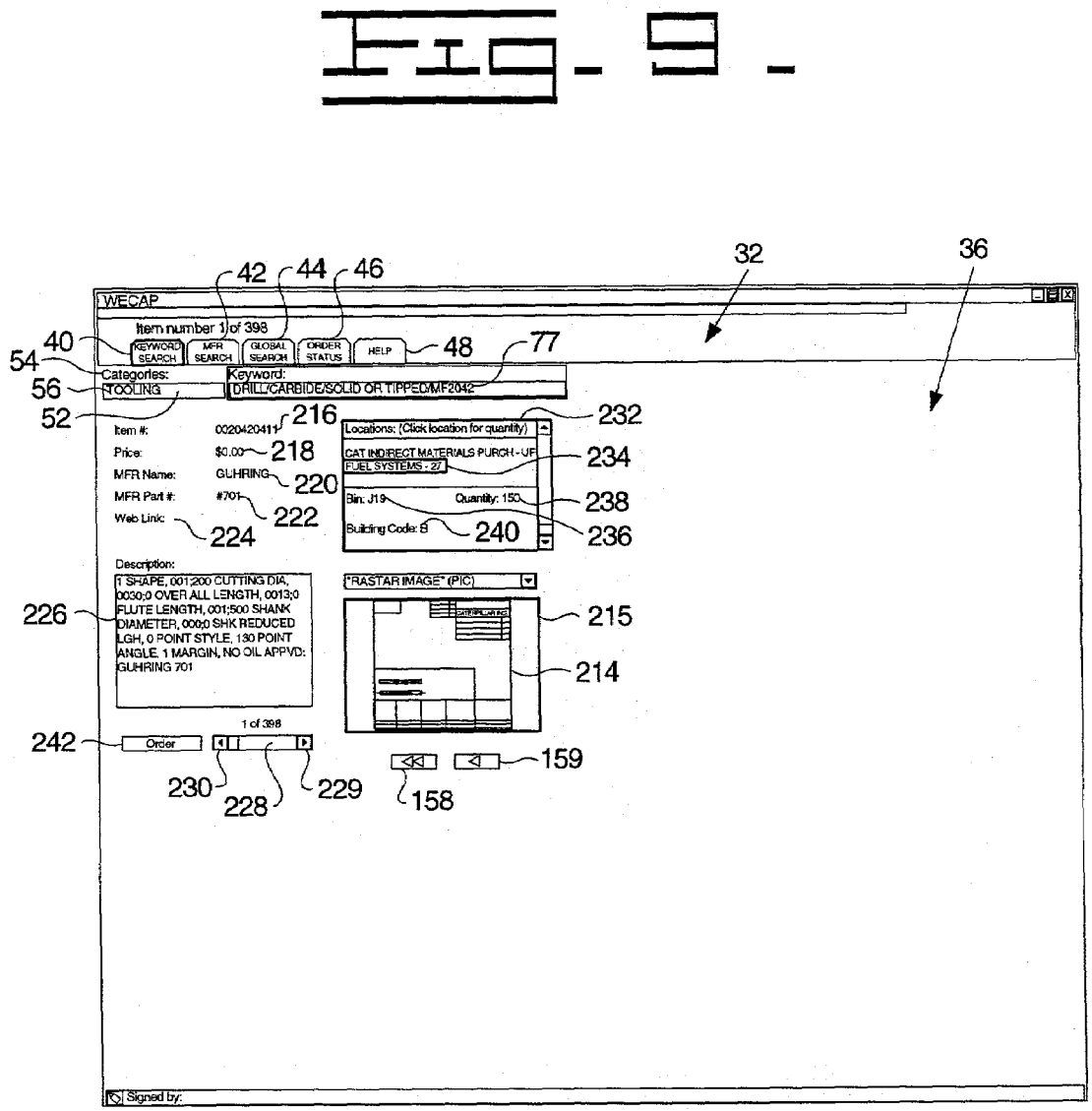
FIG. 9 illustrates an example of a detail screen.
Figure 10B:
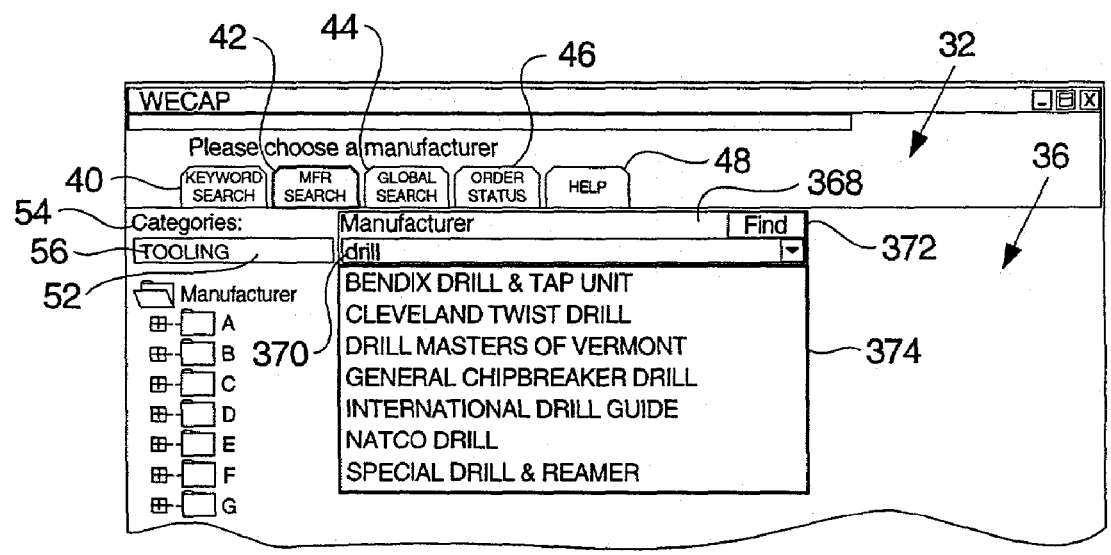
Figure 10F:
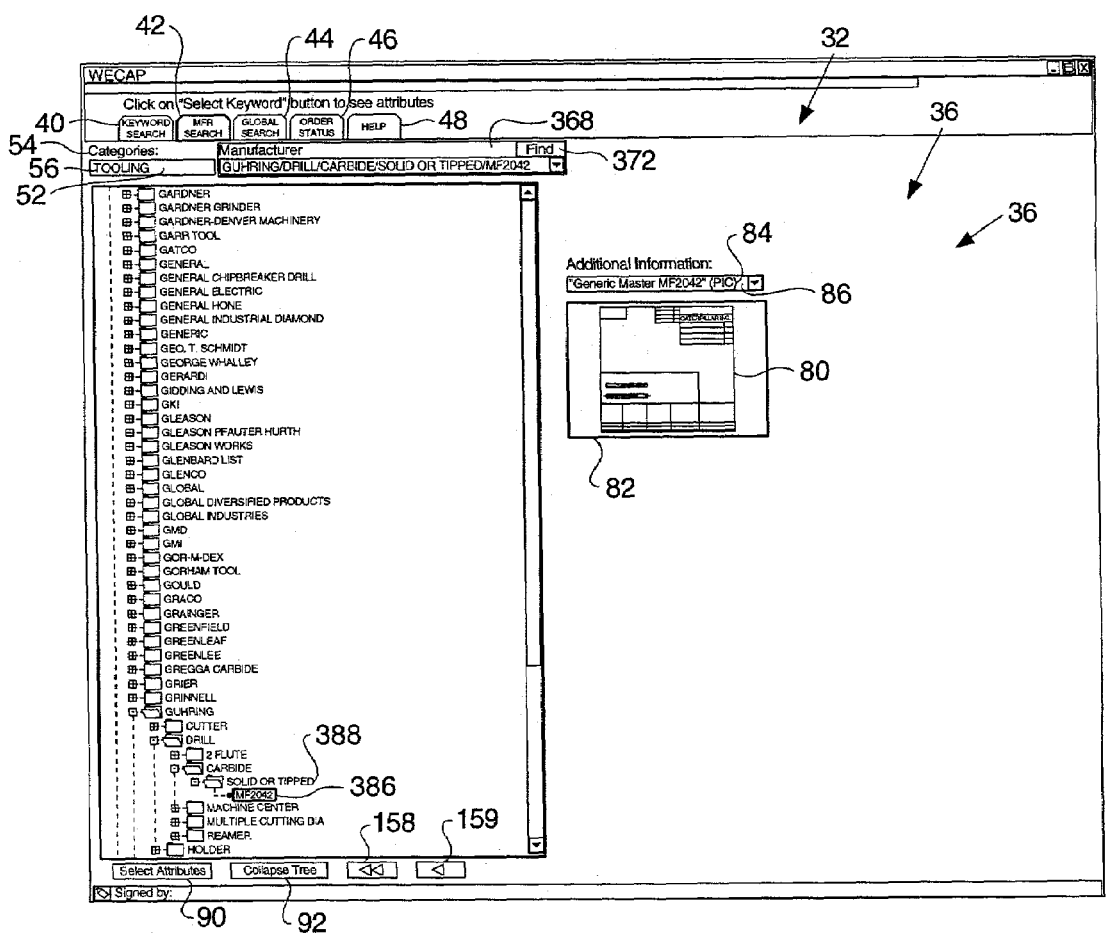
Figure 11C:
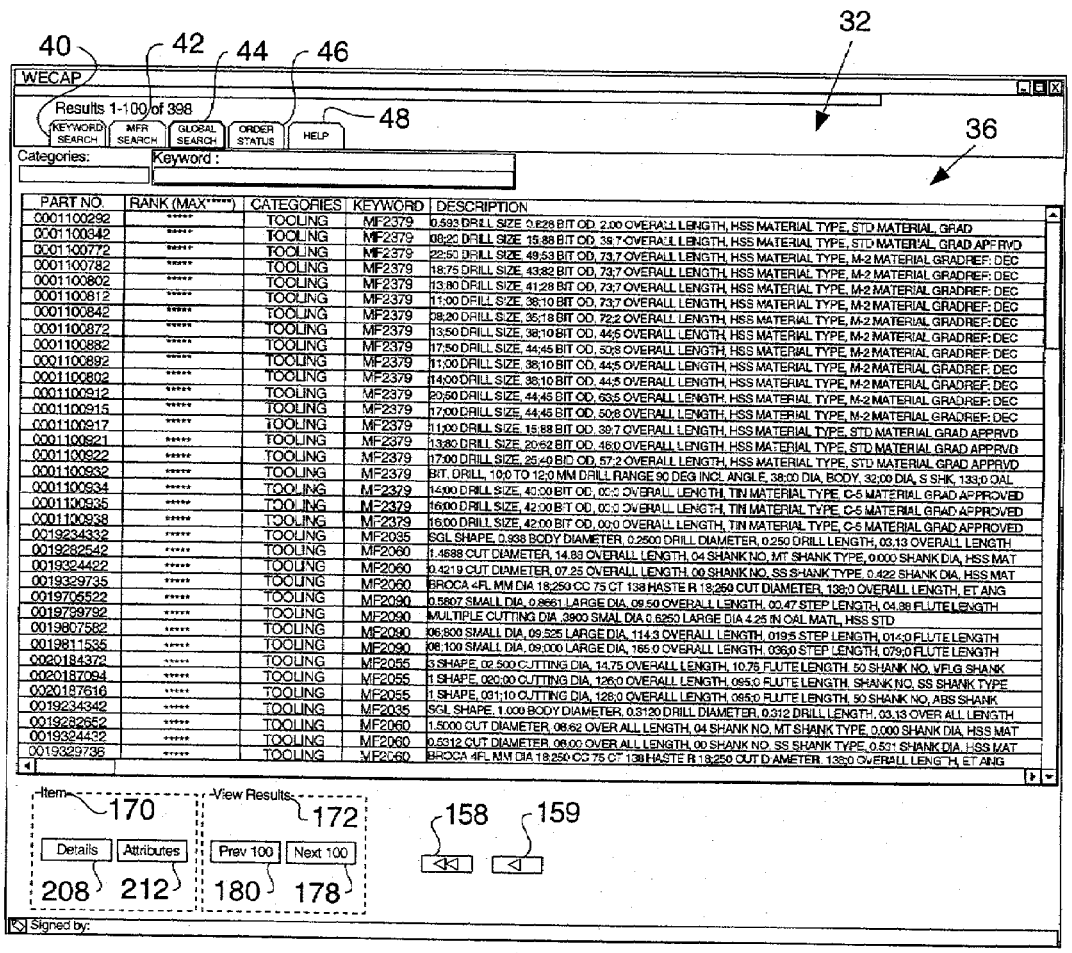
Figure 11F:
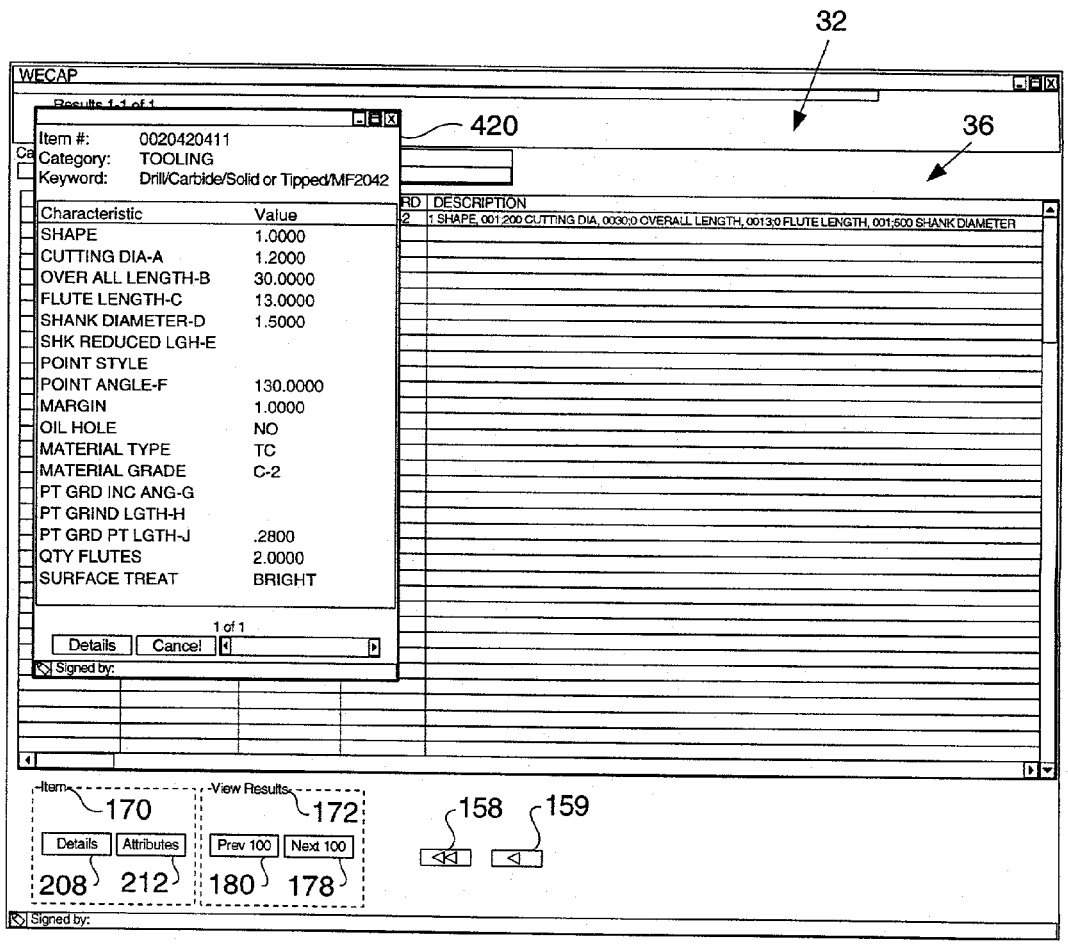
Figure 12A:
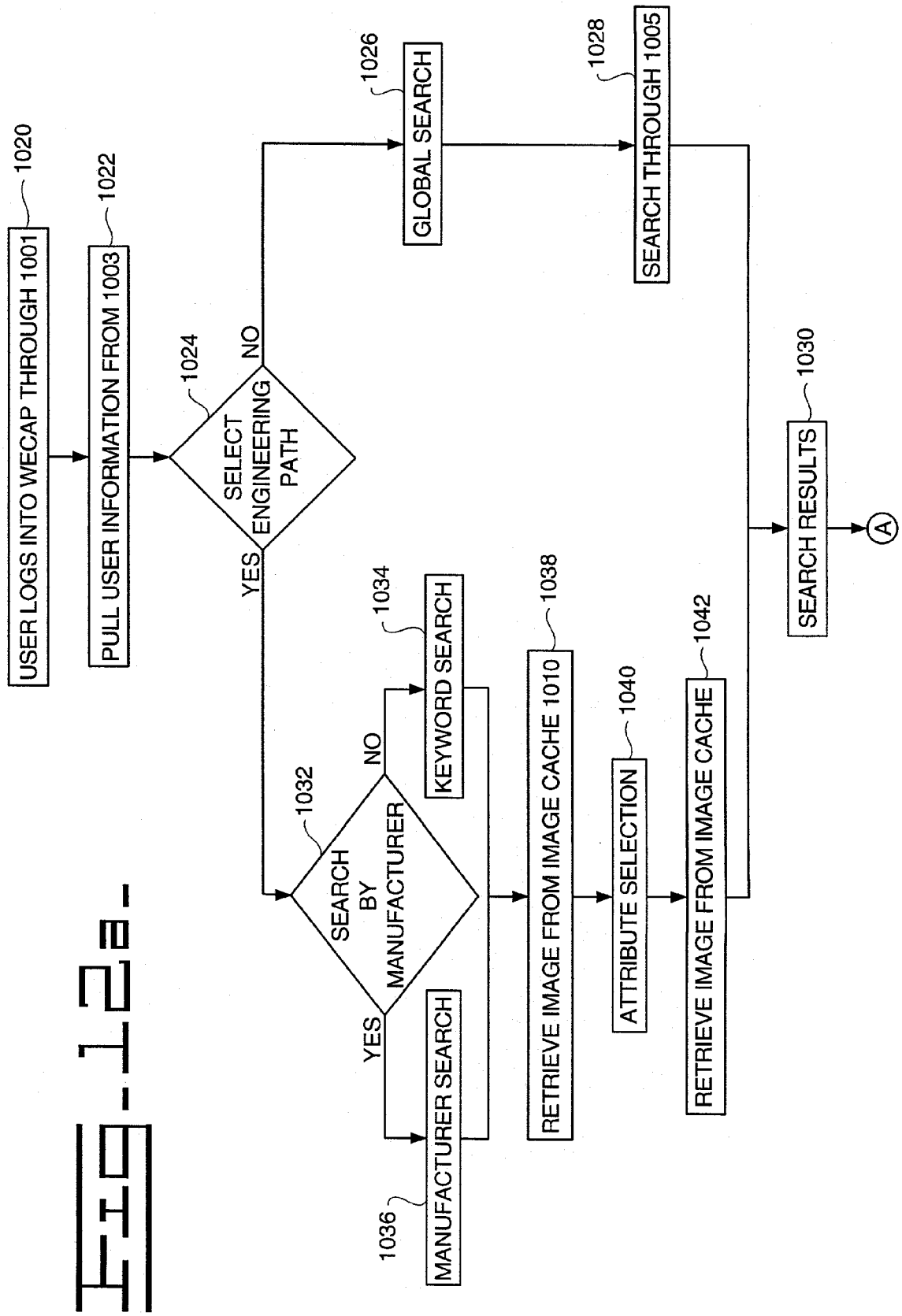
FIGS. 12A–12B illustrate the sequence of events and hardware involved in encoding, transmitting and decoding the product information using the present invention.
Figure 12B:
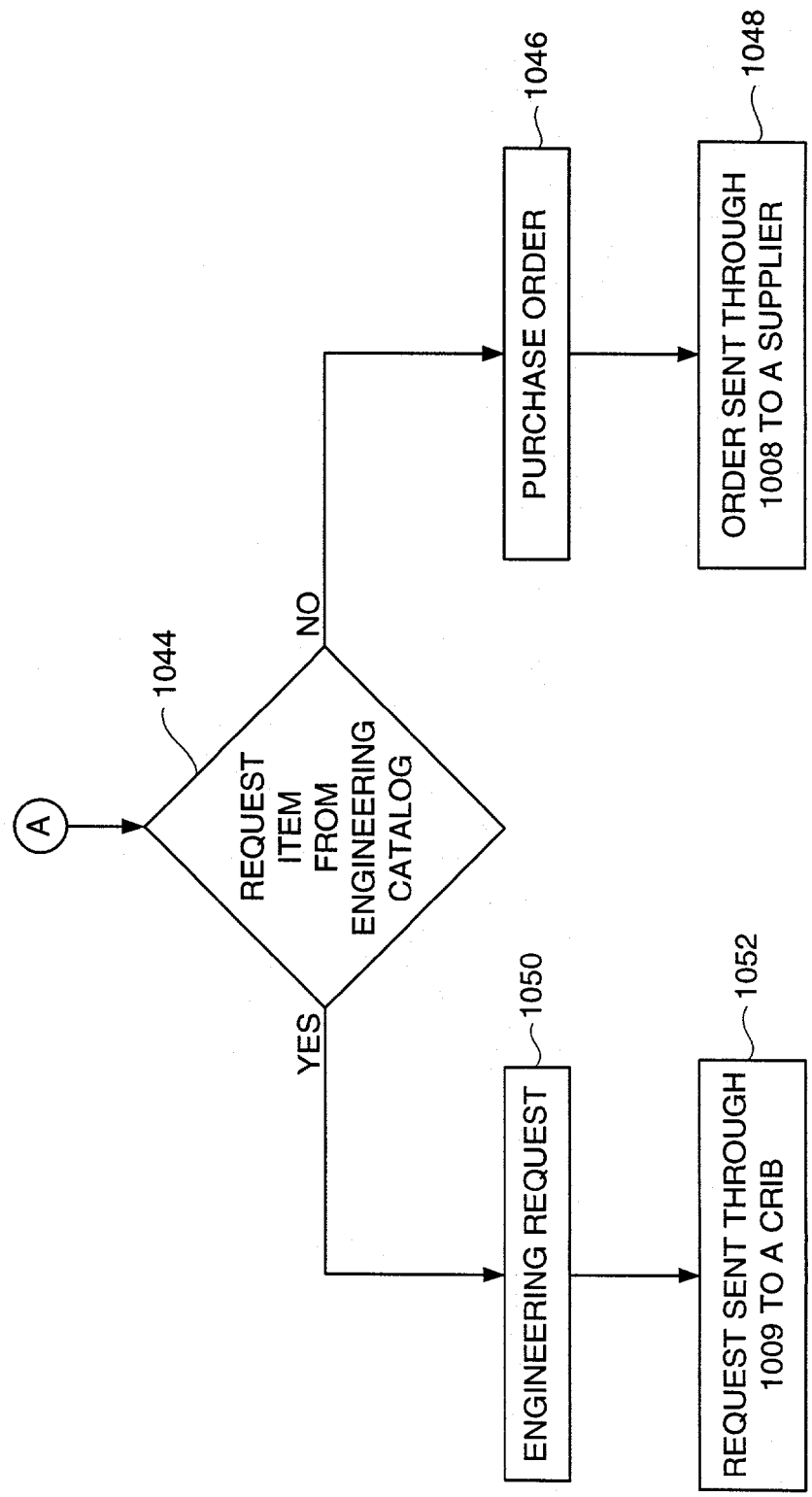
Figure 13A:
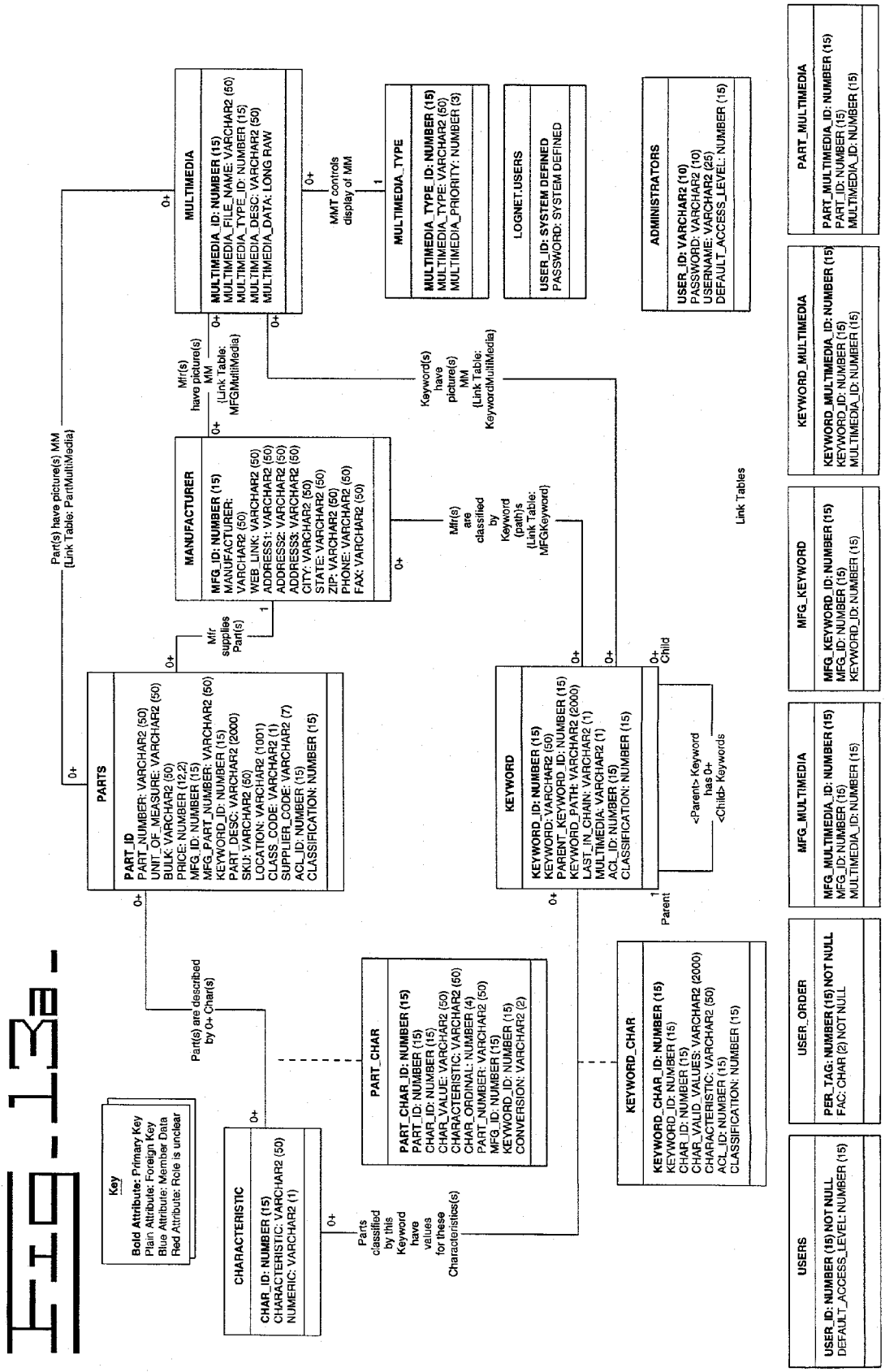
FIGS. 13A–13B illustrate the general table structure within Relation Database 1004 with individual tables and their corresponding interrelationships.
Figure 13B:
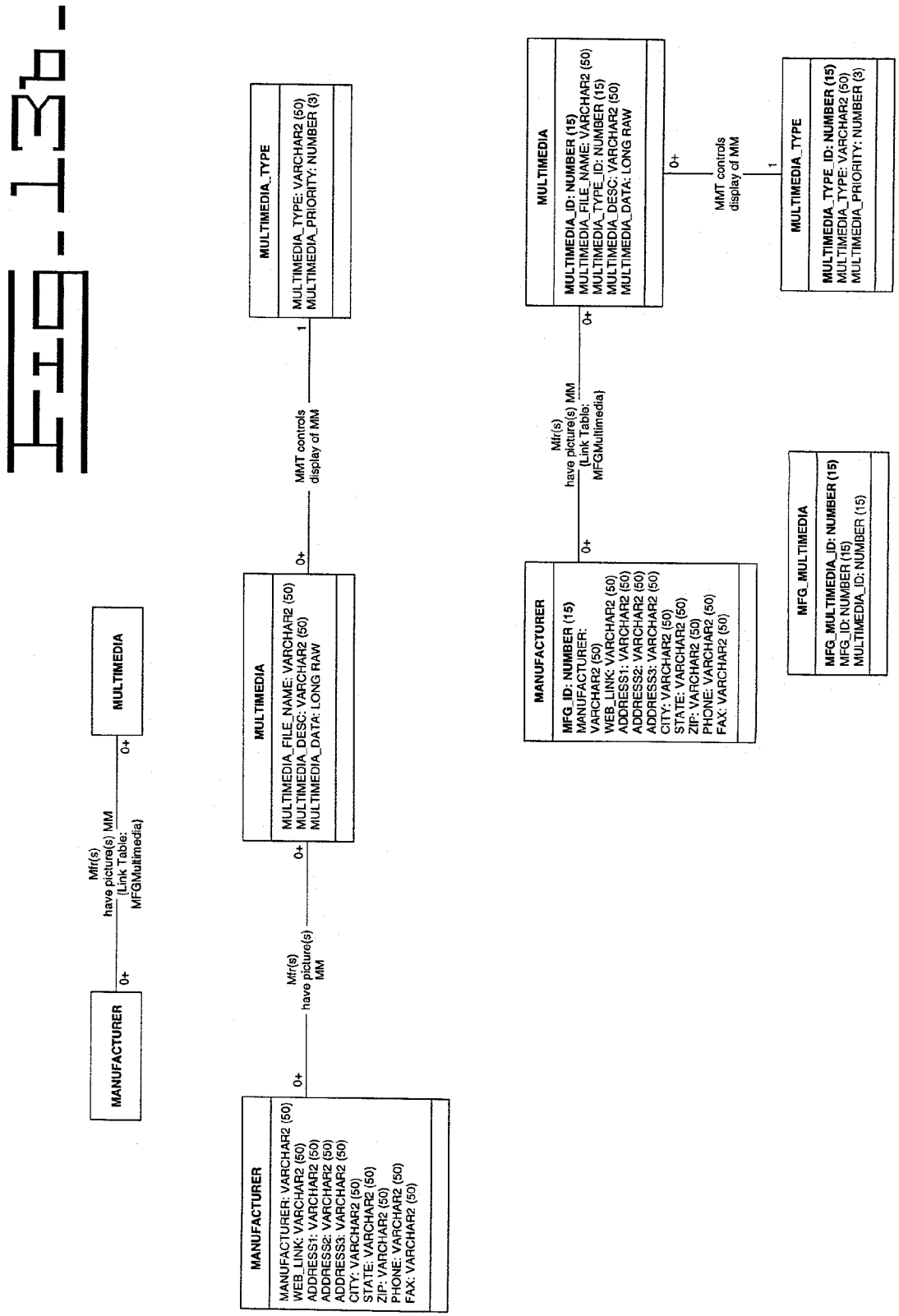

FIGS. 2–11G illustrate examples of screens, or displayed images, of one embodiment of the present invention. FIG. 3A illustrates an example depicting the initial screen for a keyword search module 40. FIG. 3B illustrates an individual portion of an exemplary screen depicting the category selection box 52 and pull-down menu within the keyword search module 40. FIGS. 4A–4D illustrate individual portions of exemplary screens depicting keyword input field 62, keyword selection tree 64, and image window 82 within the keyword search module 40. FIGS. 5A–5D illustrate individual portions of exemplary screens depicting an expanding keyword selection tree 64. FIG. 6 illustrates an example of image window 108 overlaying a screen. FIGS. 7A–7D illustrate whole and individual portions of exemplary screens depicting the differing attribute characteristics screens. FIGS. 7E–7F illustrate whole and individual portions of exemplary screens depicting the internal location and quantity search. FIGS. 8A–8H illustrate whole and individual portions of exemplary screens displaying specific attributes of each specific item as well as the sort order window 184. FIG. 9 illustrates an example of a detail screen. FIGS. 10A–10G illustrate whole and individual portions of images displaying exemplary screens within the manufacturer search module 42. FIGS. 11A–11G illustrate whole and individual portions of images displaying exemplary screens within the global search module 44. FIGS. 12A–12B illustrate the sequence of events and hardware involved in encoding, transmitting and decoding the product information using one embodiment of the present invention. FIGS. 13A–13B illustrate the general table structure within Relation Database 1004 with individual tables and their corresponding interrelationships.

INDUSTRIAL APPLICABILITY

Deciphering data from multiple manufacturers may be difficult if each manufacturer is allowed to organize his data in a different way. If this happens, each individual manufacturer would have to be dealt with in a unique way when trying to extract data from the electronic file he sent to a database. Since a particular database expects data to be organized in one particular way, there would have to be a program for each manufacturer that would decipher the data properly. It would be much simpler if there was just one standardized data format to deal with, that would satisfy all of the different manufacturers associated with a corporation needs. In the case where parametric searching is involved, figuring out what attribute characteristics define a particular item, and what the specific attributes are of each attribute characteristic are crucial for the searching to work properly. A data format must be able to handle this complexity in a way that is easy for manufacturers to enter, and for the corporation to extract.

Unfortunately, there are situations in the procurement context where an item is not able to be searched parametrically. Certain items may not yet have been standardized amongst an industry (or ISO or UN/SPSC) and thus do not have attributes that are generally understood. For instance, there are no standards for defining the attributes of a pencil. One office supplier might use color and hardness in a description, where as another office supplier might use the shape and composition of the eraser as a distinguishing feature. Since there are no standards, trying to search parametrically for such an item is impossible. This does not preclude the need for pencils to be in a procurement database however. It would still be nice to have data regarding a pencil in the database, but just be able to search it in a non-parametric way.

Thus, by having a data file format that accommodates both suppliers whose products have standardized attributes and/or keywords (via ISO and/or UN/SPSC) and those suppliers whose products do not have standardized attributes and/or keywords, or suppliers with both, the present invention becomes simple enough for either kind of supplier use, and flexible enough to accommodate a wide variety of industries. This will then save time and money, since only one kind of system and program is needed to accomplish the decoding and storing of supplier data from any kind of supplier.

The invention and the manner and process of making and using it are now described in such full, clear, concise and exact terms as to enable any person skilled in the art to which it pertains, to make and use the same. It is to be understood that the foregoing describes preferred embodiments of the present invention and that modifications may be made therein without departing from the spirit or scope of the present invention as set forth in the claims. To particularly point out and distinctly claim the subject matter regarded as invention, the following claims conclude this specification.

What is claimed is:

1. A method of loading a database associated with a first computer for a computerized procurement system in a standard format, said method comprising:
   creating a file describing an item available for purchase, the file including an attribute of said item;
   converting the file into an XML document at a second computer;
   transmitting said XML document from the second computer to said first computer;
   deconverting said transmitted XML document back into said file;
   parsing said deconverted file to get said attribute of said item;
   loading said attribute of said item obtained from parsing said deconverted file into said database; and
   searching said database for said item for purchase using a parametric search for said attribute of said item.

2. The method of claim 1 wherein said attribute defines attribute characteristics as specified by ISO standards.

3. The method of claim 1 wherein said attribute defines the item as specified by UN/SPSC standards.

4. The method of claim 1 further comprising searching said database using a textual search for said item.

5. A computer-readable medium having a plurality of sequences of instructions stored thereon which, when executed by a processor cause said processor to perform the steps of:
   creating a file describing an item available for purchase, the file including an attribute of said item;
   converting the file into an XML document at a first computer;
   transmitting said XML document from the first computer to a second computer;
   deconverting said transmitted XML document back into said file;
   parsing said deconverted file to get said attribute of said item;
   loading said attribute of said item obtained from parsing said deconverted file into a database associated with said second computer; and
   searching said database for said item using a textual search for said attribute of said item.

6. The computer-readable medium of claim 5 wherein said attribute defines attribute characteristics as specified by ISO standards.

7. The computer-readable medium of claim 5 wherein said attribute defines the item as specified by UN/SPSC standards.

8. The computer-readable medium of claim 5, the steps further comprising searching said database for said item using a parametric search for said attribute of said item.

9. A computer readable medium storing a computer program for generating a data signal embodied in a carrier wave for encoding a plurality of sequences of instructions which, when executed by a processor, cause said processor to transmit data from a computer associated with said processor describing an item by performing the steps of:
   creating a file describing an item available for purchase, the file including an attribute of said item;
   converting the file into an XML document at a first computer;
   transmitting said XML document from the first computer to a second computer;
   deconverting said transmitted XML document back into said file;
   parsing said deconverted file to get said attribute of said item;
   loading said attribute of said item obtained from parsing said deconverted file into a database associated with said second computer; and
   searching said database for said item for purchase using a parametric search for said attribute of said item.

10. The computer readable medium of claim 9 wherein said attribute defines attribute characteristics as specified by ISO standards.

11. The computer readable medium of claim 9 wherein said attribute defines the item as specified by UN/SPSC standards.

12. The computer readable medium of claim 9, the steps further comprising searching said database for said item using a textual search for said attribute of said item.

13. An apparatus for loading a database for a computerized procurement system in a standard format comprising:
   a first computer system configured to create a file describing an item available for purchase, the file including an attribute of said item, convert the file into an XML document, and transmit said XML document to a second computer system; and
   the second computer system configured to receive said transmitted XML, deconvert said XML document back into said file, parse said file to get said attribute of said item, load said attribute of said item obtained from parsing said file into said database, and search said database for said item using a parametric search for said attribute of said item.

14. The apparatus for loading a database of claim 13 further comprising: means for encoding data in ISO format.

15. The apparatus for loading a database of either claim 13 or claim 14 further comprising:
   means for decoding data from an ISO format.

* * * * *